US012652101B2

(12) United States Patent
Sethi et al.

(10) Patent No.: US 12,652,101 B2
(45) Date of Patent: Jun. 9, 2026

(54) DYNAMIC TRAFFIC SHAPING FOR SATELLITE NETWORKS

(71) Applicant: Hughes Network Systems, LLC, Germantown, MD (US)

(72) Inventors: Yogesh Sethi, Boyds, MD (US); Daniel Christopher Hantz, Montgomery Village, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 316 days.

(21) Appl. No.: 18/236,871

(22) Filed: Aug. 22, 2023

(65) Prior Publication Data

US 2025/0070856 A1     Feb. 27, 2025

(51) Int. Cl.
*H04B 7/185* (2006.01)
*H04W 28/02* (2009.01)

(52) U.S. Cl.
CPC .... *H04B 7/18513* (2013.01); *H04W 28/0278* (2013.01); *H04W 28/0289* (2013.01)

(58) Field of Classification Search
CPC ............ H04B 7/18513; H04B 7/18586; H04B 7/195; H04B 7/2041; H04L 43/16; H04L 47/22; H04W 28/0278; H04W 28/0289
USPC ........................................ 370/235, 401, 412
See application file for complete search history.

(56) References Cited

U.S. PATENT DOCUMENTS

| | | | |
|---|---|---|---|
| 8,824,490 B2 | 9/2014 | Samuels et al. | |
| 9,756,644 B2 | 9/2017 | Xu et al. | |
| 10,021,034 B2 | 7/2018 | Hong et al. | |
| 10,177,837 B2 | 1/2019 | Ravishankar et al. | |
| 10,560,941 B2 | 2/2020 | Sethi | |
| 10,637,782 B2 | 4/2020 | Dillon et al. | |
| 11,595,113 B1 * | 2/2023 | Dickinson | H04B 7/195 |
| 11,621,770 B2 | 4/2023 | Sethi | |
| 2016/0006500 A1 | 1/2016 | Radpour | |
| 2016/0366202 A1 | 12/2016 | Phillips et al. | |
| 2021/0058989 A1 | 2/2021 | Simsek et al. | |
| 2022/0086542 A1 * | 3/2022 | Pauwels | H04L 47/22 |

(Continued)

FOREIGN PATENT DOCUMENTS

| | | |
|---|---|---|
| EP | 3923624 A1 | 12/2021 |
| WO | WO 2017139699 | 8/2017 |

OTHER PUBLICATIONS

International Search Report and Written Opinion in International Appln. No. PCT/US2024/035516, mailed on Nov. 5, 2024, 11 pages.

*Primary Examiner* — Harun Chowdhury

(74) *Attorney, Agent, or Firm* — Kilpatrick Townsend & Stockton LLP

(57) ABSTRACT

Methods, systems, and apparatus, including computer programs encoded on computer storage media, for shaping backhaul traffic. In some implementations, a system receives forward channel data to transmit to one or more terminals. The system receives a message from a gateway over a backhaul network, wherein the message includes buffer information for a data buffer of the gateway. The system determines a data transfer rate for transmitting the forward channel data to the gateway over the backhaul network, wherein the data transfer rate is determined at least in part based on the buffer information in the message from the gateway. The system transmits the forward channel data to the gateway over the backhaul network at the determined data transfer rate.

19 Claims, 7 Drawing Sheets

(56) References Cited

U.S. PATENT DOCUMENTS

| 2022/0124543 | A1 | 4/2022 | Orhan et al. |
| 2022/0417151 | A1 | 12/2022 | Sze et al. |
| 2023/0370984 | A1 | 11/2023 | Ambeskar et al. |

\* cited by examiner

Receive forward channel data to transmit to one or more terminals over a
satellite network

*402*

Organize the forward channel data into data packets

Assign transmission parameters for transmitting the data packets in
the satellite network

*406*

*404*

Receive, from a gateway over a backhaul network, data indicating a buffer
status of a buffer of the gateway

*408*

Based on the data indicating the buffer status of the buffer, adjust a backhaul
data transfer rate for transmitting forward channel data to the gateway over the
backhaul network

*410*

Transmit, to the gateway over the backhaul network, the data packets to provide
forward channel data at the adjusted transmission rate for transmission to the
one or more terminals over the satellite network

500
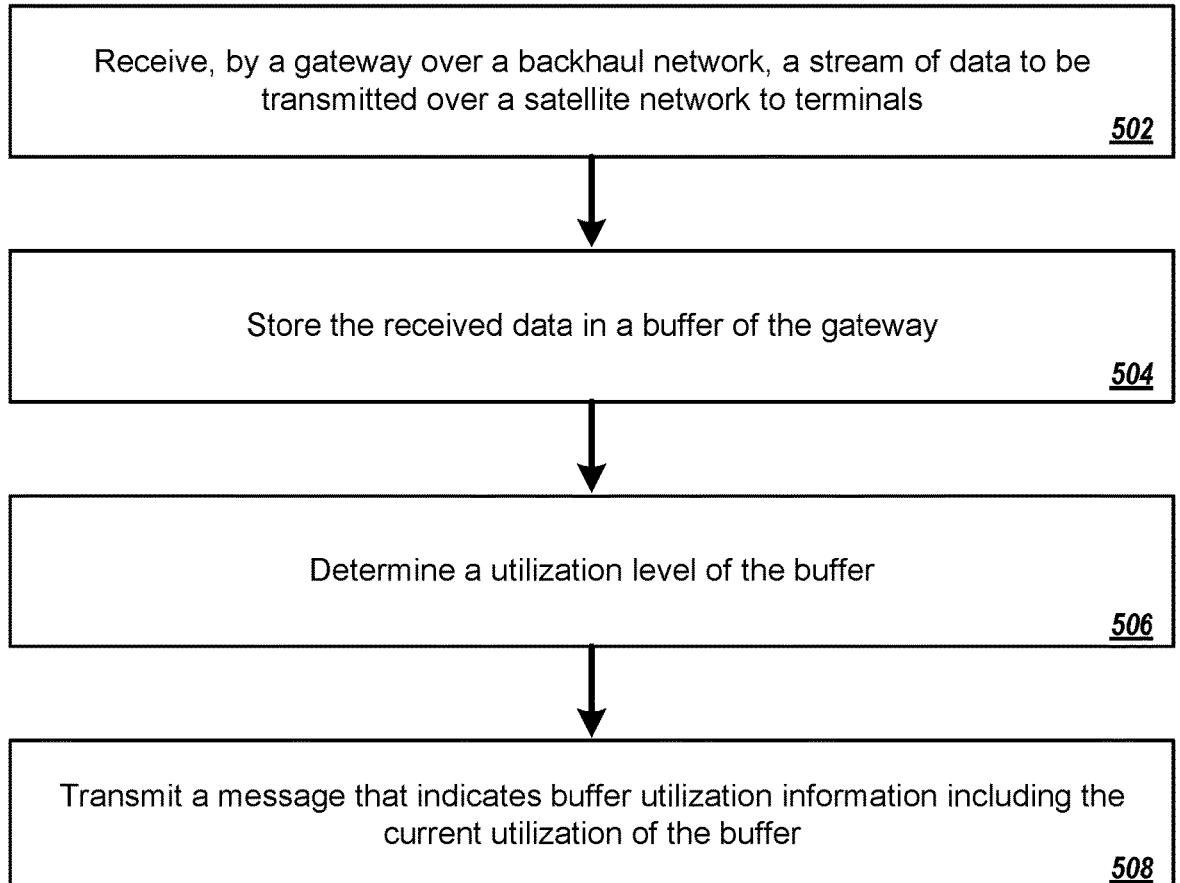
Receive, by a gateway over a backhaul network, a stream of data to be transmitted over a satellite network to terminals
*502*
Store the received data in a buffer of the gateway
*504*
Determine a utilization level of the buffer
*506*
Transmit a message that indicates buffer utilization information including the current utilization of the buffer
*508*
FIG. 5

DYNAMIC TRAFFIC SHAPING FOR SATELLITE NETWORKS

TECHNICAL FIELD

This specification relates generally to communication systems, including systems that perform dynamic traffic shaping and flow control over backhaul data networks for transmissions over wireless communication channels.

BACKGROUND

Satellite communication systems often attempt to provide communication service to devices at high efficiency. It is often desirable for a satellite communication system to relay data to various devices located at widely separated geographical locations using a consistent throughput. This throughput can be affected by disruptions in a satellite communication link, inefficiencies with the components of the satellite communication system, physical distortions of the signal being transmitted over the widely separated geographical locations, and other causes.

SUMMARY

In some implementations, a satellite communication system can dynamically shape traffic flow between a data center and a gateway to more efficiently transmit data over a satellite network. The data center can provide a stream of data for a gateway to transmit to terminals via a satellite. The system can dynamically adjust a rate that data is transmitted from the data center and the gateway as network conditions vary. These network conditions can include latency over a backhaul network, e.g., a time period or delay in transit of packets from the data center to the gateway, and jitter in the backhaul network, e.g., variability in the latency between the data center and the gateway. The gateway can monitor network conditions on the backhaul network and detect changes in backhaul network and in the gateway's data buffers (e.g., transmission queues of data to be transmitted). In some implementations, the gateway monitors backhaul network conditions and sets target data buffer levels based on the backhaul network conditions detected. The gateway can provide status data that enables the data center to adjust the data rate at which the data center sends data for the gateway to transmit over the satellite network. For example, the gateway can send a flow control message including data indicating the status of one or more data buffers, potentially with other information about backhaul network conditions. The data center can use the data in the flow control message to increase or decrease the rate of data transmitted over the backhaul network so that the gateway's buffer utilization levels become closer to the target levels. In this way, the gateway provides repeated feedback about the data traffic needs, and the data center adaptively changes the data rate at which data is sent over the backhaul network.

In further detail, the satellite communication system can include a data center, a terrestrial gateway, multiple satellite terminals (e.g., very small aperture terminals (VSATs)), and one or more satellites that can relay communications between the terminals and the gateway. The terminals can each provide network service to one or more devices, e.g., cell phones, laptop computers, desktop devices, or other devices, that can request data or send data, and the terminals can then exchange data with the gateway via a satellite. The gateway, in turn, can receive data from and provide data to a wide area network, such as the Internet, by way of a data center that is associated with the gateway. In general, a data center may be associated with and provide data to multiple different gateways, and the relationship is not limited to a one-to-one mapping.

The data center can obtain data to transmit to terminals from the Internet or another source, and can provide the data to the gateway over a backhaul network. The data center provides the data to be transmitted over the backhaul network to the gateway, and the gateway transmits the data to the terminals via the satellite. Although the gateway and the data center may be co-located, in many cases the gateway and the data center are located at different geographic locations (e.g., the data center is located remotely from the gateway). The distance between the data center and the gateway typically results in latency over the backhaul network that connects them, and the latency can vary from time to time. The backhaul network typically includes wired network connections, but like many packet-based networks the backhaul network may have varying characteristics (e.g., changing latency) over time depending on various conditions, especially as the backhaul network may include connections over the Internet or other public or third-party networks.

In satellite networks, spectrum resources are limited and it is desirable to increase the utilization of the wireless channels. For example, in a time-division multiplexing (TDM) system, it is desirable to increase use of the time slots of the forward channel (e.g., from gateway to terminal) to increase throughput for transmissions to terminals. The gateway can use a data buffer, e.g., a transmission queue, to briefly store data to transmit. Maintaining at least some data in the data buffer can help ensure that the gateway has data present and ready to transmit on the forward channel, so that all or nearly all of the time slots can carry data to the terminals. As long as some data is consistently present in the buffer, the gateway will have data to transmit and can avoid buffer underruns that can result in inefficient gaps in transmission in which spectrum is not utilized.

While it is desirable to maintain data in the buffer to achieve overall system efficiency and to increase throughput, the time that the data is held in the buffer also adds latency to the transmission process. In general, satellite communication links already have inherent latency due to the time needed for signals to propagate from the gateway to the satellite and from the satellite to the terminal. Time that data waits in a buffer to be transmitted adds additional delay that increases the total latency experienced at the terminal. This leads to a significant tradeoff: for efficiency it is important to maintain the buffer at least partially filled and to avoid buffer underruns, while it is also desirable to limit the amount of data in the buffer to avoid adding latency as experienced by the terminal.

The characteristics of the backhaul network can affect the performance of the satellite communication system as well. For example, a backhaul link introduces some latency that adds to the total latency experienced by terminals. If the gateway detects the latency is severe, e.g., exceeding a threshold level of latency, then the gateway and the data center can switch to a different backhaul link for communication. Nevertheless, even on a well-functioning backhaul link, the performance of the link can vary over time. For example, even if the average or typical latency over the backhaul network is low, the amount of latency may vary over time, resulting in jitter or inconsistent packet delivery timing. These variations in backhaul network latency may delay packets to the extent that the gateway's buffer for data to transmit may be emptied, and the buffer underrun may cause inefficiency through empty forward channel time slots. On the other hand, latency variations that result in receiving data at a higher rate than expected or desired may fill the gateway's buffer more than is desirable, which may add to the latency perceived by terminals. Receiving data faster than expected could also potentially cause a buffer overflow and the need to re-send data to the gateway.

As a result, high latency and/or jitter (e.g., variation in latency) in a backhaul link can create challenges for managing the data buffers of the gateway and can affect system performance (e.g., potentially reducing efficiency or increasing latency). To improve performance, the gateway can monitor the backhaul link between the gateway and the data center and account for instability or variation in the backhaul link's performance. As backhaul performance characteristics change, the gateway can communicate with the data center to enable the data center to adjust the flow of data to optimize data transfer over the backhaul to appropriately feed data to the gateway for transmission to the terminals.

The gateway and the data center can work together to dynamically shape real-time traffic flows. This can be implemented as a form of feedback control, where the gateway performs monitoring on an ongoing basis and repeatedly informs or instructs the data center about conditions to repeatedly adapt to changing conditions over time. For example, the gateway can monitor parameters such as backhaul network latency, backhaul network jitter, and/or the state of the gateway's forward channel data buffers (e.g., amount of stored data waiting to be transmitted to terminals). The gateway can communicate these parameters to the data center to enable the data center to use these parameters to incrementally adjust the rate that it sends data to the gateway. Through coordinated adjustments to the rate that data is sent from the data center to the gateway, the gateway and/or the data center can manage the state of the data buffers, to make incremental adjustments so that the buffer levels are maintained at or near a target level (e.g., a target such as 40% full, 50% full, 60% full, etc.). The gateway can also use the monitored parameters to adjust the target level over time, such as to increase the target level for the data buffers as jitter increases (e.g., to reduce the increased risk of buffer underrun caused by increased jitter) or to reduce the target level for the buffer as jitter decreases (e.g., to reduce latency observed by the terminals when backhaul conditions permit it).

In some implementations, the gateway and the data center measure the data for transmission in terms of the amount of wireless symbols that are used to transmit the data over the wireless satellite link. For example, the data center can calculate a transmission symbol rate for transmitting the data stream to the gateway using data provided by a gateway. The gateway can receive the data stream over the backhaul network. The transmission symbol rate for the backhaul network is not necessarily the symbol rate for data transmitted on the wireless satellite channel(s), because the data center can increase or decrease the transmission symbol rate for the backhaul link to manage the gateway's buffer (e.g., to allow the gateway's buffer to fill to a greater extent or to allow the buffer level to be reduced). For example, the gateway can provide data that indicates the current buffer level to the data center. The data center, in turn, can use the data that indicates the current buffer level to adaptively change the specified symbol rate for the backhaul data transfer to account for changes in backhaul network performance. This can occur even if the symbol rate and channel capacity for forward channel transmissions over the wireless satellite channel remains constant. As discussed further below, the data center can include a code rate organizer that coordinates and assigns data for transmission to the appropriate satellite channels. As a result, the data center can use information about the modulations and codings to be used, so that the data center can translate between amounts of data and the amounts of symbols that would be used to transmit that data given current modulation, coding, and other parameters to be used for a given wireless channel.

To shape the traffic flow from the data center to the gateway, the gateway can provide buffer level data to the gateway that enables the gateway to adjust its transmission symbol rate for the data stream sent from the data center to the gateway. The gateway is configured to transmit data over the forward wireless channel to terminals at a particular symbol rate, and that symbol rate is typically constant for each wireless channel. Nevertheless, to manage the state of the data buffer and adjust for changes in backhaul network conditions, the data center may determine (or the gateway may request) a backhaul data transfer rate that differs from the symbol rate of the wireless channel. For example, if the gateway's buffer level is filled more than the desired target level, then the data center can reduce its backhaul data transfer rate so the buffer utilization gradually decreases toward the target level. If the gateway's buffer is below the desired target level, then the data center can increase its backhaul data transfer rate, so the gateway's buffer utilization gradually increases toward the target level while the gateway continues to transmit data to the terminals. In this manner, the gateway and the data center together can adaptively shape the backhaul data stream to fill the gateway's data buffer to a desired level that keeps the satellite link occupied while limiting latency caused by buffering.

One way that the satellite communication system can monitor and adapt for varying backhaul latency and varying backhaul jitter is to monitor the state of the data buffer that stores data for forward channel transmission. As discussed above, the data buffer can be configured to temporarily store data received from the data center (e.g., in a queue, such as a first-in, first-out (FIFO) queue or priority queue) and be used as a source of data for the gateway to transmit to terminals via a satellite. The gateway can use a flow control module to repeatedly monitor a depth of the data buffer, e.g., the amount of data stored or percentage of the buffer that is filled. The flow control module can monitor the state of the data buffer periodically, such as at a predetermined interval, e.g., a flow control interval (FCI). At the predetermined interval, the gateway can provide the measured current buffer, the target buffer depth, and other information to the data center over the network. The data center can compare the current buffer depth (or a measure determined using the current buffer depth) with the target buffer depth, and then, if needed, determine a change to the data rate for the data stream over the backhaul network. In some implementations, if the gateway communicates using multiple backhaul links, the gateway can use multiple data buffers, with each buffer used for a separate backhaul link. In some implementations, the gateway can use a single buffer that stores data received from each of multiple backhaul links.

In some implementations, the gateway uses different data buffers for different channels, which helps the gateway and the data center manage buffer utilization and data transfer rate separately for different channels. The gateway can use separate data buffers for different physical channels or logical channels. For example, the gateway can use separate data buffers for different satellite beams and/or for different frequency channels. This enables the system to adjust the backhaul data transfer rate and buffer utilization level for each channel separately, to avoid buffer underruns and to perform fine-tune buffering at the individual channel level.

In some implementations, the gateway uses separate data buffers for logical channels such as for transfer of data in different quality-of-service (QOS) classes or traffic priority levels. For example, for a particular frequency channel used on a particular satellite beam, there can be a first data buffer for high-priority traffic (e.g., for voice calls, video calls, and other transfers that need low latency), a second data buffer for intermediate-priority traffic (e.g., for data for interactive web pages and other), and a third data buffer for low-priority traffic (e.g., for bulk data transfer, such as file downloads or other uses where higher latency or lower throughput is acceptable). The gateway can track the data buffer utilization level for each QoS class and coordinate with the data center so that the data rate is adjusted separately for each class. This allows the system to dynamically adjust the mix of traffic in each QoS class individually as well as in aggregate across the QoS classes (e.g., for the physical channel as a whole).

In some implementations, the flow control module at the gateway can monitor the depth of a data buffer. The flow control module can set a maximum size or depth of the data buffer, so the data buffer is allocated to be sufficiently large to handle the expected range of backhaul network conditions. The maximum depth of the buffer can be determined based on a maximum latency over each of one or more backhaul links and/or based on a maximum and minimum jitter values. The flow control module can set the size of the data buffer to be the maximum size or depth that is appropriate given the historical conditions. Sizing the data buffer in this way can reduce the risk that the gateway will encounter a buffer overflow condition. With the data buffer allocated, the gateway can initiate receiving data from the data center, storing data in the buffer, and transmitting the stored data from the buffer.

In order for the flow control module to analyze the conditions of the stored buffer, and, more specifically, to analyze the backhaul link data rate of the data center to the gateway, the flow control module can define a target buffer utilization level. The target buffer utilization level can be a reference buffer level that indicates a preferred amount of data to be maintained in the buffer. The target buffer utilization level can specify a desired amount of data to be stored in the buffer at any given time in order to prevent network issues over the satellite communications network. The gateway can change the target buffer utilization level over time as backhaul conditions change. As the gateway receives data from the data center and stores data in the buffer for transmission to the terminals, the flow control module can periodically analyze the buffer depth level at a predetermined interval, e.g., a flow control interval (FCI). For example, the flow control module can analyze the depth of the buffer at every 200 milliseconds (ms), 250 ms, 500 ms, or another interval. Based on the analysis of the buffer depth level, the flow control module can take one or more actions in tandem with the data center to smooth out the data transfer from the data center to the gateway, and not overflow or underflow the buffer at the gateway.

For example, the backhaul data transfer rate for a particular satellite channel can be 200 Megasymbols per second (Msps) from the data center to the gateway. The gateway can buffer the received data and transmit the data to the terminal over a satellite link. The gateway attempts to send the data over the satellite link in a uniform fashion, e.g., such as to smooth or increase utilization of the satellite link. When receiving the data from the data center, the flow control module can, at periodic intervals, analyze a current buffer level of the buffer and provide status data indicating the current buffer level and other information to the data center. The data center can compare the current buffer level with the target buffer utilization level. For example, if the target buffer utilization level is set to 50% utilization, and the current utilization of the buffer level is 85%, then the data center can calculate a lower backhaul data transfer rate to use. For example, the data center can reduce the backhaul data transfer rate to a symbol rate of 195 Msps, so that the utilization level of the buffer begins to trend down toward the target buffer utilization level of 50% utilization. Similarly, if the target buffer utilization level is set to 50% utilization, and the current utilization level of the buffer is 20%, then the data center can determine to increase the backhaul data transfer rate to a symbol rate of 220 Msps, so that the utilization level of the buffer begins to fill more and trend upwards toward the target buffer utilization level of 50% utilization. This process can be repeated at desired intervals, or for successive monitoring periods, and can adjust the backhaul data transfer rate at each of the intervals as the buffer level changes or as the latency or jitter occurs across each of the communication links. The process can also be performed in parallel for each of various different channels and their respective data buffers.

The data center, the gateway, and the terminals can communicate over the satellite network using multiple communication schemes. On the forward channel, e.g., from the gateway to terminals over the satellite network, these components can communicate using a time-division multiplexing (TDM) communication scheme. On the reverse channel, e.g., from terminals to gateway over the satellite network, these components can communicate using a multi-frequency time division multiple access (TDMA) communication scheme. The TDMA communication scheme can divide periods of time into frames, each of which is composed of time slots. A frame is a unit of time for distributing bandwidth in distinct time slots among terminals. Each frame can be divided into an integral number of slots and each slot can have a duration representing a predetermined length in symbols. Additionally the TDMA scheme allows multiple terminals in the satellite communication system to share the same channel frequency bandwidth, with the terminals taking turns and transmitting and receiving in the time slots that they are respectively assigned.

The techniques described herein can improve communication throughput and reduce overall latency by adjusting a data transfer rate over a backhaul communication link between a data center (e.g., a server system) and a terrestrial gateway for a satellite communication network. This allows the system to adjust the backhaul data transfer rate over time to maintain the gateway's data buffers at or near a target buffer utilization level that accounts for latency and jitter in the backhaul link. The system also adaptively changes the target buffer level to account for changes in the latency and jitter on the backhaul link. By managing the backhaul data transfer rates and buffer levels over time, the system can provide terminals data with minimal delay and the gateway can increase utilization of the spectrum resources of the satellite communication network.

In one general aspect, a method performed by one or more computers includes: receiving, by the one or more computers, forward channel data to transmit to one or more terminals over at least one wireless channel of a satellite network; receiving, by the one or more computers, a message from a gateway over a backhaul network, wherein the message includes buffer information for a data buffer of the gateway, wherein the data buffer corresponds to the at least one wireless channel; determining, by the one or more computers, a data transfer rate for transmitting the forward channel data to the gateway over the backhaul network, wherein the data transfer rate is determined at least in part based on the buffer information in the message from the gateway; and transmitting, by the one or more computers, the forward channel data to the gateway over the backhaul network at the determined data transfer rate, the forward channel data being transmitted to the gateway for transmission by the gateway to the one or more terminals over the at least one wireless channel of the satellite network.

In some implementations, the buffer information includes buffer status information that specifies at least one of (i) a utilization level of the data buffer and a target utilization level for the data buffer or (ii) a difference between the utilization level of the data buffer and the target utilization level of the data buffer. The data transfer rate is determined based at least in part on the buffer status information.

In some implementations, the utilization level of the data buffer indicates at least one of (i) a quantity of symbol-sized portions of forward channel data that are stored in the data buffer or (ii) a measure of transmission time to transmit the forward channel data stored in the data buffer on the at least one wireless channel. The data transfer rate for transmitting the forward channel data to the gateway is a symbol rate for forward channel data to be sent to the gateway over the backhaul network.

In some implementations, the target utilization level is based on at least one of (i) a measure of latency of communication between the one or more computers and the gateway over the backhaul network or (ii) a measure of variation in latency of communication between the one or more computers and the gateway over the backhaul network.

In some implementations, the message corresponds to a particular time, and the buffer information includes a packet identifier that identifies a data packet that, at the particular time, most recently had its forward channel data added to the data buffer. The data transfer rate is determined based at least in part on the packet identifier.

In some implementations, determining the data transfer rate includes: determining a quantity of forward channel data sent since transmission, by the one or more computers, of the data packet indicated by the packet identifier in the buffer information; and determining the data transfer rate to account for the quantity of forward channel data sent since transmission of the data packet indicated by the packet identifier in the buffer information.

In some implementations, the buffer information specifies at least one of (i) an interval between assessments of a status of the data buffer or (ii) a frequency at which the status of the data buffer is assessed; and the data transfer rate is determined based at least in part on the packet identifier.

In some implementations, the method includes: assigning transmission parameters for transmitting the forward channel data in the satellite network; based on the assigned transmission parameters: applying forward error correction (FEC) coding to the forward channel data to generate FEC-encoded data; and determining symbol sizes for the FEC-encoded data according to modulations specified by the assigned transmission parameters; and organizing the FEC-encoded data into a series of data packets. Determining the data transfer rate includes determining a symbol rate for transmission of the FEC-encoded data over the backhaul network; and transmitting the forward channel data to the gateway at the determined data transfer rate includes transmitting the series of data packets to provide the FEC-encoded data over the backhaul network at the determined symbol rate.

In some implementations, the method includes, before receiving the message, transferring the forward channel data to the gateway over the backhaul network at a first data transfer rate. Determining the data transfer rate includes determining a second data transfer rate based on the buffer information in the message, wherein the second data transfer rate is different from the first data transfer rate. The method includes adjusting data transfer to the gateway from (i) transmitting the forward channel data to the gateway at the first data transfer rate to (ii) transmitting the forward channel data to the gateway at the second data transfer rate.

In some implementations, the buffer information in the message indicates that utilization of the data buffer is less than a target utilization level for the data buffer; determining the second data transfer rate includes determining a data transfer rate that is higher than the first data transfer rate; and adjusting data transfer to the gateway includes increasing a rate of data transfer to the gateway.

In some implementations, the buffer information in the message indicates that utilization of the data buffer is higher than a target utilization level for the data buffer; determining the second data transfer rate includes determining a data transfer rate that is less than the first data transfer rate; and adjusting data transfer to the gateway includes decreasing data transfer to the gateway.

In some implementations, the method includes: transmitting, to one or more gateways, forward channel data for each of multiple different gateways, wireless channels, or traffic classifications; and separately determining a data transfer rate for each of the multiple different gateways, wireless channels, or traffic classifications based on buffer information for the respective gateways, wireless channels, or traffic classifications.

In some implementations, the forward channel data is transmitted over the backhaul network in a series of data packets, wherein the buffer information includes a value indicating (i) a utilization level for the data buffer and (ii) a packet identifier for a packet most recently added to the data buffer at a time corresponding to the message. The method includes estimating an updated buffer utilization level based on the utilization level indicated in the message and the packet identifier indicated in the message, and the data transfer rate is determined based in part on the estimated updated buffer utilization level.

In some implementations, estimating the updated buffer utilization level is performed using (i) the packet identifier, (ii) a quantity of data packets of forward channel data transmitted to the gateway over the backhaul network after the data packet indicated by the packet identifier, and (iii) a transmission symbol rate at which the gateway transmits the forward channel data in the satellite network.

In some implementations, the method includes: determining, by the one or more computers, a reference data transfer rate; determining, by the one or more computers, an adjustment factor based on a difference between a target buffer utilization level for the data buffer and a utilization level of the data buffer; and determining, by the one or more computers, the data transfer rate by adjusting the reference data transfer rate by the adjustment factor, wherein the determined data transfer rate increases or decreases a rate of forward channel data transfer to the gateway to move the current utilization of the buffer toward the target buffer utilization level.

In some implementations, the adjustment factor is further determined based on a frequency or interval at which the gateway is configured to measure the utilization of the data buffer.

In some implementations, the method includes: after receiving the message, determining, by the one or more computers, a quantity of forward channel data transmitted by the one or more computers to the gateway over the backhaul network since the gateway transmitted the message; and estimating, by the one or more computers, a utilization level of the data buffer based on (i) a utilization level indicated by the message and (ii) the determined quantity of forward channel data transmitted since the gateway transmitted the message. The adjustment factor is determined based on the estimated utilization level.

In some implementations, determining the quantity of forward channel data transmitted since the gateway transmitted the message based on (i) a packet identifier that represents a data packet that was last stored in the data buffer at a time corresponding to a measured buffer utilization indicated in the message and (ii) a packet identifier for a data indicating transmitted by the one or more computers to the gateway over the backhaul network.

In another general aspect, a method includes: receiving, by a gateway and from a server system over a backhaul network, forward channel data to be transmitted to terminals over a satellite network; storing, by the gateway, the received forward channel data in a data buffer before transmitting the forward channel data to the terminals over the satellite network; measuring, by the gateway, a latency for the backhaul network using the received forward channel data; determining, by the gateway, a target buffer utilization level for the data buffer based on the measured latency; and transmitting, by the gateway, a message to the server system, wherein the message includes buffer information determined based on the target buffer utilization level.

In some implementations, the method includes determining a level of variation in the latency over the backhaul network over time, where the target buffer utilization level is determined based on the level of variation in the latency over the backhaul network.

In some implementations, receiving the forward channel data includes receiving a stream of data packets from the server system over the backhaul network; and measuring the latency for the backhaul network includes determining, for at least some of the data packets, a time of receipt of the data packet and a transmission time indicated in a header of the data packet.

In some implementations, the method includes repeatedly performing a measurement and adjustment cycle that includes: evaluating the latency in transmission of forward channel data over the backhaul network; and adjusting the target buffer utilization level for the data buffer based on the evaluation of the latency.

In some implementations, evaluating the latency in transmission of forward channel data over the backhaul network includes measuring the latency for the backhaul network and measuring latency jitter for the backhaul network.

In some implementations, repeatedly performing the measurement and adjustment cycle includes performing the measurement and adjustment cycle at a predetermined interval.

In some implementations, the measurement and adjustment cycle further includes sending, to the server system, an additional message based on the adjusted target buffer utilization level, wherein the additional message includes updated buffer information for the data buffer.

In some implementations, the buffer information includes buffer status information that specifies at least one of (i) a utilization level of the data buffer and a target utilization level for the data buffer or (ii) a difference between the utilization level of the data buffer and the target buffer utilization level of the data buffer.

In some implementations, the utilization level of the data buffer indicates at least one of (i) a quantity of symbol-sized portions of forward channel data that are stored in the data buffer or (ii) a quantity of transmission time to transmit the forward channel data stored in the data buffer.

In some implementations, receiving the forward channel data includes receiving a stream of data packets from the server system over the backhaul network. The message includes buffer information that corresponds to a particular time; and the buffer information includes a packet identifier that identifies a data packet of the stream of data packets that, at the particular time, most recently had its forward channel data added to the data buffer.

In some implementations, the method includes: determining a size for the data buffer based on measured latency characteristics for the backhaul network; and allocating the data buffer to have the determined size.

In some implementations, the method includes repeatedly adjusting the target buffer utilization level based on changes in latency characteristics of the backhaul network, wherein the latency characteristics include at least one of latency of the backhaul network or variation in latency of the backhaul network, wherein the adjusted target buffer utilization levels are each less than a buffer size of the data buffer, and wherein the adjustments set the target buffer utilization levels to achieve a predetermined relationship between the target buffer utilization levels and the latency characteristics of the backhaul network.

In some implementations, the method includes determining the target buffer utilization level for the data buffer based on the measured latency includes setting the target buffer utilization level to have a predetermined relationship with respect to a measure of latency jitter determined for the backhaul network.

In some implementations, the predetermined relationship sets the target buffer utilization level to a quantity of data for a transmission duration equal to the measure of latency jitter.

In some implementations, the predetermined relationship sets the target buffer utilization level to a quantity of data that combines (i) a quantity of data for a transmission duration equal to the measure of latency jitter and (ii) an additional quantity of data to provide a predetermined level of margin.

In some implementations, the data buffer is configured to receive and store data for a particular data center, wireless channel, or traffic classification.

In some implementations, the method includes: allocating multiple different data buffers each for a different data center, wireless channel, or traffic classification; adjusting target utilization levels for each of the multiple different data buffers; and sending, to one or more data centers, data indicating buffer information for the respective data buffers, wherein the buffer information for includes buffer status indicating a difference between a current utilization level and a target utilization level.

In some implementations, the method includes: retrieving data from the stored buffer; and transmitting the retrieved data from the stored buffer to the terminals over the satellite network.

Other embodiments of these and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 4 and 5 are flow diagrams that illustrate example processes for adjusting data transfer from a data center to a gateway in a satellite communication network.

Like reference numbers and designations in the various drawings indicate like elements.

DETAILED DESCRIPTION

Figure 1A:
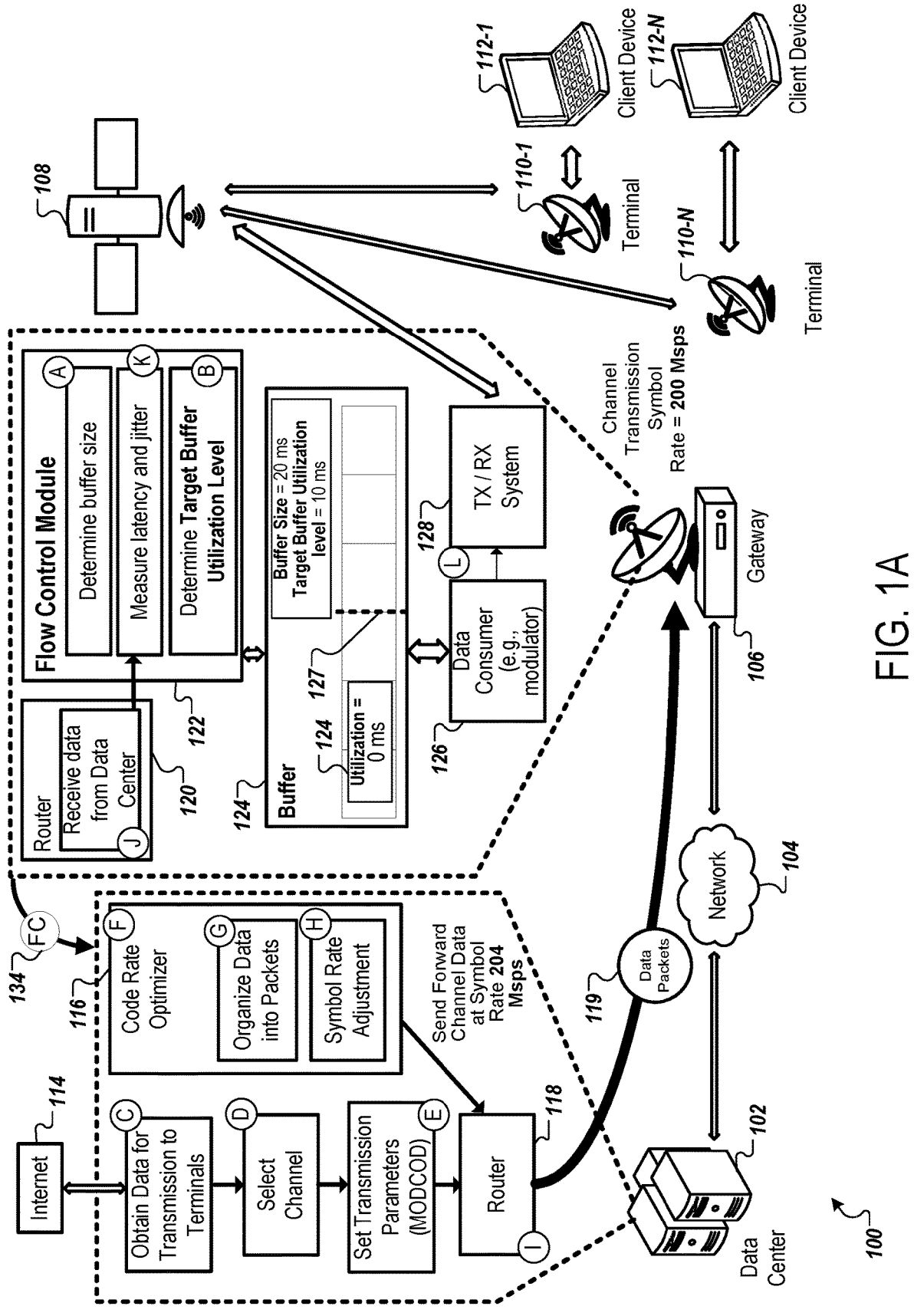
FIGS. 1A-1C and 2 are diagrams showing examples of a system for dynamically adjusting characteristics of data transfer from a data center to a gateway in a satellite communication network.

FIG. 1A is a diagram that shows an example of a system 100 for dynamically adjusting characteristics of data transfer in a satellite communication network, such as for adjusting data transfer from a data center to a gateway. The example of FIG. 1 shows a satellite communication, but the techniques described here can be used in other wireless communication systems. The system 100 includes a gateway 106 that communicates with a satellite 108, and the satellite 108 communicates with various satellite terminals 110-1 through 110-N (collectively "terminals 110"). The satellite 108 and the gateway 106 (along with other network components), can cooperate to transfer data to and from the terminals 110 to one or more servers at a data center 102 or a satellite network center (SNC) over a backhaul network 104. The data center 102 provides a connection to the Internet 114 and/or one or more other networks, so the system 100 can provide the terminals 110 network service.

The data center 102 can communicate with one or more external devices or networks, such as the Internet 114. The backhaul network 104 can include one or more public and/or private networks, and can include the Internet 114. The backhaul network 104 can be provided using any of various communication media, such as a wired network, a fiber optic network, a cellular network, or a combination of multiple network types. The backhaul network 104 can provide one or more backhaul links or connection paths through which the data center 102 and the gateway 106 communicate. The data center 102 can include one or more computers, such as one or more servers. FIG. 1A illustrates various operations in stages (A) through (L), which can be performed in the sequence indicated or in another sequence, and with fewer stages or with more stages.

Each of the terminals 110 can be in communication with and provide network service to one or more client devices 112, such as hand-held devices, telephones, laptop computers, desktop computers, Internet of Things (IoT) devices. For example, the terminals 110 can each be very small aperture terminals (VSATs). The client devices 112 make use of the network service provided by the terminals 110, the satellite 108, the gateway 106, and the data center 102. For example, as illustrated in FIG. 1A, terminal 110-1 provides network service to the client device 112-1 and the terminal 110-N provides network service to the client device 112-N. Each of the terminals 110 may provide network service to more than one client device 112.

The satellite 108 can include capabilities for transmitting and receiving with different components of the system 100. For example, the satellite 108 can include one or more antennas that can communicate bi-directionally with each of the terminals 110 and the gateway 106.

The system 100 provides communication on a forward channel (e.g., downlink transfer from the gateway 106 to the terminals 110 via the satellite 108) using a time-division multiplexing (TDM) scheme. An example of the TDM scheme can include, for example, Digital Video Broadcasting-Satellite-Second Generation Extension (DVB-S2X).

The system 100 also provides communication on a reverse channel (e.g., uplink transfer from the terminals to the gateway 106 via the satellite 108) using a Time Division Multiple Access (TDMA) communication scheme. The gateway 106 can allocate slots in TDMA frames to each of the terminals 110 for communicating over the connection with the satellite 108. For example, the gateway 106's allocation of data transfer bandwidth can include multiple slots in the TDMA communication scheme for each terminal to send and/or receive data. For example, the gateway 106 can make burst assignments that include a starting slot number and a length of number of slots. In the TDMA scheme, the terminals 110 can share the same channel frequency but communicate in different time slots on that channel frequency to avoid collisions with one another.

In the system 100, the data center 102 receives data from the Internet 114 or other sources for forward channel transmission to the terminals 110 and their client devices 112 over the satellite network. The data center 102 provides this forward channel data to the gateway 106 over the backhaul network 104, and the gateway 106 transmits the forward channel data to satellite 108 to be provided to the terminals 110 for their respective client devices 112. The data center 102 provides the forward channel data to the gateway 106 in a data stream, such as a series of packets, over the backhaul network 104. The backhaul network 104 often includes one or more public or private networks, and can include the Internet 114. The backhaul network 104 is often provided or operated at least in part by other parties, and latency conditions can vary over time.

The gateway 106 often transmits on wireless channels with fixed symbol rate on the feeder link for transmission to the satellite 108, although a fixed transmission symbol rate is not required. The data center 102 can provide forward channel data at a rate calculated to increase throughput and utilization of the spectrum resources available. As discussed further below, the data center 102 can adjust the data transfer rate that the data center 102 provides forward channel data to the gateway 106, to manage and address varying network conditions on the backhaul network 104 such as changes in latency characteristics.

The gateway 106 also provides reverse channel data, e.g., data received from the terminals 110 via the satellite 108, to the data center 102 through a backhaul link provided by the backhaul network 104. For example, the gateway 106 can receive requests or data uploads that the terminals 110 sent, and the gateway 106 provides the requests and data uploads to the data center 102 to be distributed to various servers or other destinations through the Internet 114.

The data center 102 and the gateway 106 can be time-synchronized according to one or more time protocols, e.g., precision time protocol (PTP), to provide consistent and reliable timing between the two systems.

In some implementations, the gateway 106 can include various components that enable transmission and reception in the system 100. For example, the gateway 106 can include one or more routers, e.g., router 120, for communicating with the data center 102 over the backhaul network 104. Similarly, the gateway 106 can include a transmitter that includes a radio frequency (RF) transmit chain and an antenna for transmitting data in the satellite network. Similarly, the gateway 106 can include a receiver that includes an RF receive chain and an antenna for receiving data in the satellite network. The transmitter can include components related to coding, modulating, and upconverting of symbols to be prepared for transmission. Similarly, the receiver can include components related to downconverting, demodulating, and decoding of received symbols. The transmitter and receiver are represented in FIG. 1 as the TX/RX system 128.

In some implementations, the gateway 106 can include multiple antennas, as well as multiple transmitters and receivers for each antenna to concurrently handle communications on different channels or carriers. For example, the gateway 106 can be configured to communicate using different wireless channels (e.g., physical channels), such as different bands or spectrum ranges (e.g., one channel at 38 GHz to 39 GHz, another channel form 39 GHz to 40 GHz, etc.) as well as different polarizations for a given band (e.g., one channel with right-hand circular polarization (RHCP), another channel with left-hand circular polarization (LHCP), etc.). The system 100 may further define additional channels, such as virtual channels that represent different traffic flows or different classifications of traffic within a single physical channel.

In some implementations, the gateway 106 and the data center 102 can dynamically shape data transfer over the backhaul network 104 to reduce an overall latency of communications for the terminals 110. The gateway 106 and the data center 102 can limit or minimize the overall latency experienced by adaptively changing the data transfer rate for forward channel data from the data center to the gateway 106. For example, the data transfer rate can be adjusted by taking into account the latency on the backhaul network 104 as well as the variation or fluctuation of the latency on the backhaul network 104. The data transfer rate can be repeatedly adjusted based on the status of a data buffer 124 at the gateway 106, so the gateway 106 can maintain an appropriate level of buffer utilization to avoid buffer overflow and also avoid buffer underrun. In addition, the target buffer utilization that the system attempts to achieve can be repeatedly adjusted, allowing the system to compensate for changing conditions, such as changes in backhaul network latency and changes in the variation in the backhaul network latency. In addition, as discussed further below, the gateway 106 and the data center 102 can coordinate to perform these adjustments separately and concurrently for many different segments or types of traffic, such as for different backhaul networks and/or backhaul network connections, for different wireless transmission channels (e.g., different polarizations and/or frequency ranges), for different quality of service (QOS) classes within individual wireless transmission channels, and so on. For example, a separate buffer can be used for each segment or type of traffic to be managed (e.g., for each class or category of data transferred), and data rate adjustments can be performed for each segment or type of traffic.

The gateway 106 can maintain a data buffer 124 (e.g., a transmission queue) to temporarily store forward channel data received from the data center 102 before it is transmitted to the terminals 110. It is desirable to consistently maintain at least some level of data stored in the buffer so the gateway 106 does not run out of forward channel data to transmit (e.g., an underrun condition), which would lower efficiency with "dead air" time when spectrum is not being utilized because the gateway 106 has no data to transmit on a channel. High latency on the backhaul link and/or high variation in latency on the backhaul link may make it desirable to increase the amount of data that is buffered. Nevertheless, many buffers are used in a first-in, first-out manner, and so the more data is stored in a buffer (e.g., the higher the utilization or buffer depth), the higher the latency for transmission (e.g., when new data to be transmitted enters the buffer, the new data must wait to be transmitted until the already-buffered data is cleared from the buffer and transmitted first). In addition, the greater the percentage of a buffer is used, the greater the risk of buffer overrun, with accompanying inefficiencies for requiring the data center 102 to retransmit lost data to the gateway 106 again over the backhaul network 104.

The present techniques provide an effective way to balance the competing objectives of maintaining efficiency and reducing latency, even as conditions of the backhaul network vary. For example, the data center 102 and the gateway 106 can cooperate and coordinate the flow of forward channel data over the backhaul link to limit buffer utilization at the gateway to minimize added latency in the satellite network, while still maintaining sufficient buffer utilization to avoid a buffer underrun given the current or recent backhaul network latency characteristics. One way this can be done is for the gateway 106 to set or adjust a target buffer utilization level based on backhaul network latency characteristics it measures, and then send buffer information to the data center 102 (e.g., to indicate current buffer utilization level, the target buffer utilization level, a difference between the current and target utilization levels, etc.). With the buffer information from the gateway 106, the data center 102 can adjust its data rate for sending forward channel data to the gateway 106 over the backhaul network 104 to move the buffer utilization toward the target buffer utilization level.

Over time, latency characteristics of the backhaul network can change, which can affect the actual buffer utilization at the gateway 106 and the target level of buffer utilization that will keep the risk of buffer overrun and buffer underrun to appropriate levels. The gateway 106 can thus monitor backhaul network latency on an ongoing or repeated basis, and can adjust its target buffer utilization level based on the recent level of variation in backhaul network latency. The updated buffer information is then used to adjust the data-center-to-gateway data transfer rate so that buffer utilization moves toward the newly adjusted target buffer utilization level. This allows low latency while maintaining high efficiency, by limiting the risk of both buffer overrun and buffer underrun to appropriate levels. The system monitors buffer utilization level and backhaul network latency over time, and the backhaul data transfer rate can be repeatedly adjusted to move toward the target buffer utilization level. For example, feedback about buffer utilization can be used to adjust the data transfer rate up or down, according to conditions experienced, toward the target buffer utilization level.

The system 100 can adjust the target buffer utilization level (referred to also simply as "target buffer level" herein) as conditions change. For example, as latency and/or latency variation increase on the backhaul network, the gateway 106 can increase the target buffer level to better maintain efficiency and limit the risk of buffer underrun. As latency and/or latency variation decrease on the backhaul network, the gateway 106 can decrease the target buffer level to reduce latency while still maintaining a low risk of underrun protection, as well as to further reduce the risk of buffer overrun. With communication from the gateway 106, the data center 102 responds to changes in the target buffer level, as well as in the current buffer level, to adjust the data transfer rate at which the data center 102 sends data to the gateway 106, moving buffer utilization toward the target level. As a result, by adjusting the target buffer level and the data transfer rate, efficient use of spectrum and high throughput can be provided consistently (e.g., by avoiding buffer underruns), while latency in the satellite network can be reduced when backhaul network conditions permit lower levels of buffering. The system 100 allows this level of adaptability in target buffer level and in data transfer rate separately for each backhaul link, channel, and/or QoS class, allowing for fine-grained and responsive adjustments.

In further detail, the gateway 106 and the data center 102 may communicate over one or more backhaul links or backhaul connections over backhaul network 104 to service the terminals 110. Each of these backhaul links may incur some amount of latency. If the latency over one of the backhaul links is severe enough, e.g., the latency exceeds a threshold value, then the gateway 106 and the data center 102 can switch to using a different backhaul link. However, the new backhaul link may have a different latency than the previous backhaul link, and the terminals 110 may experience different terminal-perceived latencies due to the changing of the backhaul links. In some cases, a backhaul link may incur different latencies over time, which can lead to buffer underruns or buffer underruns that can reduce efficiency of the satellite network.

For example, the gateway 106 may be configured to transmit to the satellite 108 on a wireless channel with a fixed transmission symbol rate of 200 Msps. This channel may be used to provide data traffic for many different terminals 110 and their corresponding client devices 112. The data center 102 may transmit forward channel data at 200 Msps, equal to the gateway's transmission symbol rate for the channel, but latency on the backhaul link and variation in latency on the backhaul link (e.g., latency jitter) may disrupt the flow of forward channel data. For example, if latency briefly increases by 10 ms, and if the gateway 106 does not have at least 10 ms worth of forward data to transmit already buffered, there may be a gap in transmission while the gateway 106 waits to receive more data. As another example, if the data center 102 transmits data at too high of a data rate, this may cause the buffer to fill more than is needed to account for latency jitter, and it will increase the latency for communication in the satellite network. It may cause a buffer overflow and loss of data at the gateway 106, along with the need to re-transmit the lost data over the backhaul link. Similarly, if the data center 102 transmits data at too low of a data rate, this may cause buffer underflow and reduce the effective throughput and spectrum utilization with which the gateway 106 can transmit the data over the satellite 108.

In order to provide high efficiency, the gateway 106 and the data center 102 can collectively manage the data transfer across the backhaul network 104 and ensure smooth communications exists across the satellite 108 to the terminals. This data transfer can help ensure that the forward channel (e.g., the link between the gateway 106 and terminals over the satellite 108) remains occupied at a desired level, e.g., utilizes the available bandwidth or spectrum as much as possible while also reducing overall latency. One way that the gateway 106 and the data center 102 can manage the data transfer over the backhaul network 104 and to adapt to varying latency and jitter constraints is for the gateway 106 to utilize a data buffer and communicate the status of the data buffer to the data center 102, so the data center 102 can adjust the backhaul data transfer rate appropriately.

In the illustrated example, the gateway 106 includes a data buffer 124 for a particular channel. The gateway 106 uses the data buffer 124 to temporarily store forward data received from the data center 102 before the gateway 106 transmits the forward channel data to one or more terminals 110 in the satellite network. In some implementations, the gateway 106 can use multiple buffers, each buffer utilized for a corresponding backhaul link and/or a corresponding channel. For clarity in illustration, a single data buffer 124 for a single channel is illustrated, but the gateway 106 can concurrently use multiple buffers to service multiple channels that are concurrently being utilized (e.g., with a separate buffer for each channel). More generally, the gateway 106 may use a separate buffer for each data center it receives data from, for each channel it transmits on, and/or for each of different traffic flows or traffic classifications within a channel.

In some implementations, the gateway 106 can utilize a single buffer to store data from multiple different sources or to store data for multiple different channels. For example, the gateway may use a single buffer to store data received from multiple backhaul links over the backhaul network 104. As another example, the gateway 106 can utilize a buffer to store data for multiple channels, e.g., using two buffers that each store data for two channels. In implementations that use a shared buffer, the gateway 106 may perform additional processing and analysis to track the amount of buffered data corresponding to different channels, so the gateway 106 can still generate and communicate status information at a fine-grained level.

The data buffer 124 can be a transmission queue, and can be implemented as a first-in, first-out (FIFO) queue. As a result, there is a delay between adding data to the data buffer 124 and subsequent transmission of the stored data in the satellite network. In this manner, the buffering of data to be transmitted at the gateway 106 can add a terminal-perceived latency because the stored data in the data buffer 124 has to wait for earlier-added data to be transmitted before being transmitted to the terminals. Thus, in order to minimize the wait time for transmitting data from the data buffer 124, the gateway 106 can work to keep the buffer utilization level (e.g., buffer depth or amount of data buffered) low but still sufficiently high to avoid buffer underruns. For example, the gateway 106 can use a measure of latency jitter for the backhaul network 104 to set a target buffer level that will store enough forward channel data to handle expected latency variation without adding excess latency. If the data buffer 124 is overfilled, e.g., a stored depth of the buffer level is greater than the target buffer level, then buffering may cause higher latency than is needed to account for the effects of latency jitter. Similarly, if data buffer 124 is underutilized, e.g., a stored depth of the buffer level is less than the target buffer level, then there is potential for a buffer underrun that may reduce inefficiency and throughput due to "dead air" time when the gateway 106 has no forward channel data available to transmit.

The gateway 106 can use a flow control module 122 that repeatedly monitors a depth or utilization of the data buffer 124 at an appropriate interval, and also monitors latency and latency jitter of the backhaul network 104. When the gateway uses multiple buffers (e.g., for different data centers, backhaul links, channels, and/or traffic categories), the flow control module 122 can monitor a depth of each of the multiple buffers separately. The flow control module 122 can be implemented, for example, using one or more field programmable gate arrays (FPGAs) in the gateway 106. In some cases, the flow control module 122 can be implemented in a modem or other component of the gateway 106.

In some implementations, the flow control module 122 performs various functions, such as (1) determining an appropriate size to allocate for the data buffer 124, (2) monitoring latency characteristics of the backhaul network 104, (3) setting a target buffer utilization level for the data buffer 124, and (4) determining buffer information, such as the current status of the data buffer 124. The flow control module 122 may also generate data for flow control messages to the data center 102, where the flow control messages provide buffer information and potentially other information about the data flow over the backhaul network 104.

As an example, the flow control module 122 can determine the size for the data buffer 124, e.g., an amount of memory to allocate which represents the maximum amount of data that can be stored in the data buffer 124. The size of the data buffer can be set based on the maximum amount of variation in latency observed for communication over the backhaul network 104 over a period of time. For example, if the backhaul network 104 is determined to have had a minimum latency of 15 ms over a time period, and a maximum latency of 25 ms for the time period, then the amount of variation in latency, e.g., the "latency jitter," is 10 ms. The flow control module 122 can set size of the data buffer 124 to store enough data to cover transmission for a multiple of the latency jitter. For example, the size of the data buffer 124 can be set to handle data for a period of twice the latency jitter, or 2*10 ms=20 ms. If the transmission symbol rate for the corresponding channel is 200 Msps, then the data buffer 124 would need to be sized to hold 4 MSym of forward channel data. As will be discussed below, it is often desirable to buffer an amount of data corresponding to the maximum expected latency jitter for the backhaul network 104. To provide space to handle excess data and provide margin above that desired amount of buffering, the size of data buffer 124 allocated can be larger than the target buffer utilization level, such as twice the target buffer storage level (which in this example is twice the amount of latency jitter).

The flow control module 122 can also determine a target buffer utilization level using the latency characteristics of the backhaul network 104. The target buffer utilization level can represent a desired amount of forward channel data to be stored in the data buffer 124, in an ongoing or steady-state manner. In other words, as new forward channel data is received and added to the data buffer 124, and as the gateway 106 concurrently removes stored data from the data buffer 124 to transmit, the amount of data maintained is desired to be at or near the target buffer utilization level. In some implementations, the target buffer utilization level for the data buffer 124 for a channel is the amount of data that would be transmitted on the channel over a period of time equal to the latency jitter of the backhaul network. For example, where the measured latency jitter (e.g., difference in maximum and minimum latency measured over a period of time) is 10 ms, then the target buffer utilization level would be 10 ms of forward channel data, or 2 MSym for a 200 Msps channel, which is 50% of the allocated size of the data buffer 124. This target is beneficial because it is the level that will increase the satellite link throughput by avoiding buffer underrun or dead air at up to the maximum latency expected, while not adding any more latency through the system than will assist to reliably achieve that level of throughput. In some implementations, the target buffer utilization level may be adjusted from the level of latency jitter to adjust the tradeoff between throughput and latency, such as by increasing the level by adding an additional margin to prioritize throughput (at the cost of additional latency) or by reducing the level to minimize latency (at the cost of potentially lower throughput).

The initial target buffer utilization level can be set manually or to a default level. As another example, the flow control module 122 can set the initial target buffer utilization level based on historical latency jitter of the backhaul network 104 or similar networks. Once the system 100 is in operation and latency jitter can be measured from ongoing data flows, the flow control module 122 can periodically measure the latency jitter and can adjust the target buffer utilization level accordingly. For example, the flow control module 122 can determine the latency jitter present over a recent period of time (e.g., seconds, minutes, hours, etc.). If latency jitter has decreased, such as from 10 ms to 8 ms, then the flow control module 122 can make a corresponding decrease to the target buffer utilization level, e.g., from 10 ms of data to 8 ms of data or from 2 MSym (50% of the buffer size) to 1.6 MSym (40% of the buffer size). By detecting and responding to changes in network conditions in this manner, when buffer utilization is adjusted down to the new target level, the latency from buffering can thus be decreased while still maintaining a sufficient amount of buffered data to maintain full throughput across the current level of latency swings on the backhaul network 104. Of course, if latency jitter is detected to increase, then the target buffer utilization level can be increased a corresponding amount to maintain maximum throughput on the satellite network. As will be discussed further below, the target buffer utilization level and the current buffer utilization level (e.g., actual amount of buffer filled) to gauge the appropriateness of the data transfer rate from the data center 102 over the backhaul network 104. The data transfer rate can then be adjusted to bring utilization to or nearer to the target buffer utilization level.

As will be further described below, the flow control module 122 can determine a utilization level (e.g., fill level or amount of buffer storage used) of the data buffer 124 and use the result to generate a flow control (FC) message to provide to the data center 102. The analysis of the buffer utilization, the determination of an appropriate target buffer utilization level, and the transmission of a FC message can be performed repeatedly at an interval. Each FC message can include buffer information that describes the status of the data buffer 124, such as (i) the utilization level of the data buffer 124, (ii) the target buffer utilization level, and (iii) data identifying the last packet received at the gateway 106 at which the analyzed level of the data buffer 124 was measured. The data center 102 can receive the FC message, extract its contents, and compare the measured utilization level with the target buffer utilization level. Based on the comparison of the current level of the data buffer 124 and the target buffer utilization level, the data center 102 can take one or more actions to alter the data transfer over the backhaul network 104, such as to increase or decrease the rate that forward channel data is provided. By adapting the rate of backhaul data transfer, the system can move the buffer utilization toward the target utilization level, which helps achieve the desired throughput and latency characteristics (e.g., maximizing throughput without increasing latency beyond what is needed to account for backhaul network latency variation). These actions can include, for example, generating and signaling a transmission symbol rate for a router of the data center 102 to use, adjusting a transmission symbol rate at the data center 102 by a desired amount, and determining to maintain the transmission symbol rate if the current level of the buffer is at or near the target buffer utilization level, and so on.

During stage (A), the flow control module 122 can determine a size for the data buffer 124, e.g., a maximum capacity to be allocated for the data buffer 124. The flow control module 122 can determine the size for data buffer 124 prior to the utilization of the data buffer 124. In some implementations, the flow control module 122 can dynamically adjust the size of data buffer 124 over time and while the data buffer 124 is being used. The flow control module 122 can determine the size for data buffer 124 in units of, for example, symbols to transmit, bits, bytes, time to clear the buffer when at a particular transmission rate, or another measurement unit.

In some implementations, the flow control module 122 can determine the size of the data buffer 124 using information about the historical or expected latency over the backhaul network 104, such as based on a measure of latency jitter over the backhaul network 104 or based on other criteria. In the illustrated example, the flow control module 122 sets the size of data buffer 124 to have a predetermined relationship with a measure of latency jitter, such as at least twice the latency jitter over the backhaul network 104. For example, if the measure of latency jitter (e.g., average or peak latency jitter over a measurement period) for the backhaul network 104 is 10 ms, then the flow control module 122 can set the size of the data buffer 124 to be large enough to store enough data for 20 ms of transmissions on the channel corresponding to the data buffer 124. The size for the data buffer 124 in symbols can be determined by multiplying the transmission symbol rate by the amount of time determined to represent the size for the buffer. For the buffer size of 20 ms and a transmission symbol rate of 200 Msps for the corresponding channel, then the buffer size would be 200 Msps×20 ms=4 MSyms.

The flow control module 122 can determine the duration of flow control interval (FCI) at which to re-evaluate the characteristics of the data buffer 124 and send a FC message to the data center 102. For example, the flow control module 122 can calculate the FCI or receive a designation of the FCI from a designer of system 100. In some implementations, the flow control module 122 can set the FCI and/or adjust the FCI from time to time, such as in response to changes in latency and latency jitter of the backhaul network 104. For example, the flow control module 122 can calculate the length of the FCI using equation (1) below:

$$FCI = 4 * (\text{jitter} + \text{latency}) \qquad (1)$$

In equation (1) above, latency represents a measure of backhaul network latency (e.g., maximum or average latency) observed over a period of time (e.g., over 1 second, 10 seconds, 1 hour, etc.), and jitter represents a measure of variation in the backhaul network latency (e.g., maximum or average jitter) over the period of time. The flow control module 122 can calculate the FCI by adding the jitter value and the latency value and multiplying the summation result by a value of four. For example, if the maximum jitter and the maximum latency are 10 ms each, then the FCI is set to 80 ms. This technique for setting the FCI provides high responsiveness without excessive amounts of computation. It allows for frequent re-evaluation of buffer status and corresponding frequent updates to the backhaul data transfer rate, while allowing time between updates for changed data transfer rates to begin affecting buffer utilization before the next update. By setting the FCI in proportion to the jitter and/or latency values, the flow control processing can automatically be performed more rapidly when latency, jitter, and target buffer utilization levels are lower, which automatically adjusts the FCI to suit the network conditions of the backhaul network 104.

During stage (B), the flow control module 122 determines a target buffer utilization level 127 for the data buffer 124. As discussed above, the target buffer utilization level 127 can serve as a reference level that represents a desired buffer depth or desired amount of data to be stored in the data buffer 124 during ongoing, steady-state operation of the system. The flow control module 122 can set the target buffer utilization level 127 according to a predetermined set of criteria, such as by setting the target buffer utilization level 127 to have a predetermined relationship with respect to a value of latency jitter for the backhaul network 104. The buffering of forward channel data at the gateway is intended to provide enough data to allow transmission to continue for the maximum amount of jitter expected. For example, over a measurement period, the minimum latency may be 15 ms and the maximum latency may be 25 ms, for a latency jitter of 10 ms. By buffering enough forward channel data for 10 ms of transmission, then the gateway 106 would be able to fill the channel with transmissions if the latency suddenly swings from 15 ms to 25 ms leaving a 10 ms gap without receiving new forward channel data over the backhaul network 104. As a result, the flow control module 122 can set the target buffer utilization level 127 according to the maximum jitter identified across the backhaul network 104 over a measurement period (e.g., a recent period of 100 ms, 1 second, 10 seconds, 1 minute, 1 hour, etc.). The target buffer utilization level 127 or the ideal buffer level can be set to correspond to the measured maximum jitter identified across the backhaul network 104. For example, if the flow control module 122 measures the maximum jitter across the backhaul network 104 to be 10 ms, then the flow control module 122 can set the target buffer utilization level 127 to represent an amount of data to fill the channel capacity for a transmission duration of 10 ms. In this case, for a configured symbol rate of 200 Msps, the target buffer utilization level 127 is set to 2 MSyms. The flow control module 122 can adjust the target buffer utilization level 127 as the jitter across the backhaul network 104 fluctuates.

In some implementations, the flow control module 122 can adjust the target buffer utilization level 127 over time in response to changes in the conditions or characteristics of the backhaul link. For example, at a frequency set by the FCI duration, the flow control module 122 can re-calculate the target buffer utilization level 127 for the data buffer 124 (and any other data buffers, such as for other channels) based on the most recent latency and jitter measurements.

The target buffer utilization level 127 can be used to control the rate of data transfer over the backhaul network 104. For example, the flow control module 122 can determine and set the target buffer utilization level 127 for the data buffer 124, and the gateway 106 and/or the data center 102 can adjust data transfer to move the actual buffer utilization level of the data buffer 124 to toward the target buffer utilization level 127. As will be further described below, the flow control module 122 can provide data to the data center 102 that enables the data center 102 to adjust its transmission symbol rate over the backhaul network 104 so the data buffer 124 at the gateway 106 remains filled at or near the target buffer utilization level 127. By maintaining a level of the data buffer 124 near the target buffer utilization level 127, the flow control module 122 and the data center 102 can work together to ensure efficient use of spectrum and high throughput can be provided consistently, while avoiding unnecessary increases in latency for terminals in the satellite network.

In the illustrated example, the data buffer 124 stores data for a single channel, e.g., for a single physical channel such as one feeder link connection from the gateway 106 to the satellite 108. Different data buffers can be separately allocated, used, and monitored for each of various different channels. In some implementations, the flow control module 122 can generate and track a target buffer utilization level for each of multiple virtual channels, where the virtual channels may represent different priority levels or QoS classes of data traffic, rather than separate physical channels. One technique is to allocate a separate data buffer for each virtual channel. Each of the buffers is individually monitored, so the buffer status is tracked for each virtual channel and the backhaul data transfer rate is adjusted for each virtual channel. In this manner, the flow control module 122 can track a buffer utilization with respect to a corresponding target buffer utilization level for each data buffer associated with each virtual channel. As another technique, a single data buffer can be used to store data for multiple virtual channels, and the flow control module 122 can track the buffer utilization for the buffer as a whole and/or for each of the virtual channels. In this technique, the flow control module 122 can manage the buffer utilization with respect to the one or more corresponding target buffer utilization levels, such as for the data buffer as a whole and/or separately for the respective virtual channels.

In some implementations, the flow control module 122 can determine the target buffer utilization level 127 according to a prior usage of data buffer 124. For example, the flow control module 122 can analyze prior historical fill levels of the data buffer 124 and calculate an average fill level of the data buffer 124 from the historical data. In some examples, the flow control module 122 can calculate an average fill level of the data buffer 124 from historical data indicating when the data buffer 124 was neither under nor overflowing. In these examples, the flow control module 122 can set the target buffer utilization level 127 according to the calculated average fill level of the data buffer 124.

During stage (C), data center 102 obtains forward channel data for forward transmission to the terminals 110. For example, the data center 102 can obtain data from any of various external third-party systems, such as third-party servers over the Internet 114, and provide the obtained data to the gateway 106 for transmission in the satellite communication network. Typically, the data center 102 aggregates data from many different sources, intended for various different terminals 110 and client devices 112, into the stream of forward channel data that is sent to the gateway 106. For example, when a client device connected to terminal 110-1 requests video data from a particular third-party source, the requested video data can be provided to the data center 102, which sends the video data to the gateway 106 over the backhaul network 104. Requests from terminals can indicate various items, e.g., a hardware address of the terminal 110 or client device 112, an IP address of the terminal 110 or client device 112, an identifier for the terminal 110 or client device 112, a destination for the requested data (e.g., a website or an application), etc. Reverse channel data from terminals 110 is routed through the gateway 106 and/or data center 102, and forward channel data to the terminals 110 can also be routed through the data center 102 and the gateway 106.

During stage (D), the data center 102 selects or identifies a channel on which forward channel data should be sent, in order to route forward channel data to the correct gateway and transmission queue. The gateway 106 may use one or more physical wireless channels to send forward channel data to the satellite 108. These channels are often referred to as feeder links, with the gateway 106 uses to feed data to the satellite 108 for transmission to the terminals 110. In the system, each feeder link from the gateway 106 to the satellite 108 can provide the data for multiple user links, including for one or more spot beams or wireless transmission channels from the satellite 108 to the terminals 110. The data center 102 can track which terminals 110 are associated with different spot beams or user links, as well as which feeder links are assigned to carry the data for those spot beams or user links, in order to route forward channel data received over the Internet 114 to the correct feeder link channel.

The gateway 106 can have multiple feeder links that are used concurrently (e.g., with different frequency ranges and/or different polarizations), each of which has a different data buffer allocated. The data center 102 also provides a data stream of forward channel data, at an appropriate data transfer rate, for each of the different feeder links. For example, the data buffer 124, with its corresponding target buffer utilization level 127, can correspond to a particular feeder link, and the data center 102 provides a forward channel data stream for that particular feeder link, with data for various terminals 110 in one or more spot beams that are supplied data by the particular feeder link. The data center 102 can track which terminals 110 are associated with various spot beams, feeder links, and other portions of the satellite network, so the data center 102 can route forward channel data for individual terminals to the correct data stream and feeder link that will allow the data to be sent on the appropriate spot beams or user links.

In some implementations, the data center 102 classifies or categorizes data traffic to prioritize certain types of traffic over other types. For example, the forward channel data for a given physical wireless channel (e.g., feeder link and/or spot beam) can be assigned different priority levels or QoS classes. The data center 102 can manage the traffic flows for the different priority levels or QoS classes separately. For example, a first QoS class can represent traffic with low latency requirements (e.g., voice call data, video call data, and so on), a second QoS class can represent traffic with medium latency requirements (e.g., web site traffic and other interactive applications), and a third QoS class can represent traffic that is less sensitive to latency (e.g., bulk file downloads). To set a desired balance among the different categories of traffic, or to better track and prioritize the different categories of traffic, the data center 102 may consider each traffic class among the data for a physical channel to be a separate virtual channel with a separate forward channel data stream sent over the backhaul network 104. Then, for each virtual channel, the gateway 106 can use a corresponding data buffer and the data center 102 can generate and send a corresponding data stream of forward channel data. In this manner, the buffering of data at the gateway 106 and the management of the forward channel data streams can be done for segments or portions of the traffic that would be sent on a physical channel, to provide more fine-grained monitoring, control, and balancing among different categories and classes of traffic.

In some implementations, the gateway 106 can use a separate data buffer 124 for each of multiple backhaul links. The gateway 106 may buffer data for backhaul links for a single wireless channel or across multiple wireless channels. In some cases, a single gateway 106 may receive data from different data centers, and may buffer data from different data centers in different data buffers. A backhaul link from a data center may correspond to one or more feeder links. Similarly, the data center 102 may provide multiple data streams over the backhaul network 104 for different channels or feeder links of the gateway 106, and the data center 102 may provide data streams to multiple different gateways.

During stage (E), the data center 102 selects transmission parameters that will be used for transmitting forward channel data in the satellite communication network. In some implementations, these functions are performed by a code rate optimizer (CRO) module 116 of the data center 102. In addition to determining the appropriate channel or feeder link, the data center 102 also determines the modulation and/or coding ("MODCOD") that will be used to transmit on that channel or feeder link. The data center 102 transmits forward channel data over the backhaul network 104 at a transfer rate that aligns with the symbol rate of the wireless channel (e.g., feeder link) that will carry the data. Accordingly, determining the MODCOD parameters that will be used facilitates the data center 102 to package and send the feeder link data a rate appropriate for the channel. For example, depending on the modulation used 8 bits be transferred might require one symbol to transmit (e.g., if 256 QAM is used), or 2 symbols to transmit (e.g., if 16 QAM is used), or 4 symbols (e.g., if QPSK is used). The channel that the gateway 106 will transmit on typically has a fixed symbol rate, and so it is useful for the data center 102 to be able to determine the number of symbols represented by data to be transmitted. This way, the data center 102 can transmit forward channel data at a data rate, calculated or accounted for in terms of the symbols that the gateway 106 will transmit.

The data center 102 can select the MODCOD parameters according to set criteria for each wireless channel, or for each data stream with a corresponding data buffer 124. In some examples, the data center 102 may specify that 16-Quadrature Amplitude Modulation (16-QAM) and a first code rate be used for a first wireless channel in the satellite network, and the data center 102 may specify that 64-QAM with a second code rate be used for a second wireless channel in the satellite network. The data center 102 can use the determined MODCOD parameters to prepare data streams to send over the backhaul network 104, including to align the amount of transmitted data (e.g., in terms of bits, bytes, and packets) to the effective transfer rates in terms of symbols that will be transmitted wirelessly by the gateway 106.

The data center 102 can include a code rate optimizer (CRO) module 116 that evaluates the forward channel data and assigns transmission parameters, such as modulations and codings to be used, so that forward channel data can be measured in terms of the number of wireless symbols that would be used to transmit the data. The CRO MODULE 116 and potentially other components of the data center 102 can perform various operations to prepare a data stream for transmission by the gateway 106. This can include applying forward error correction (FEC) coding, inserting headers or system control field values, and so on. The CRO MODULE 116 can determine the user link modulation and coding parameters that will be used and may insert appropriate control data to enable the satellite 108 to send the user link symbols with appropriate modulation and coding. To the extent that adaptive modulation and coding (ACM) is used, the CRO MODULE 116 can assign transmission parameters to different forward channel terminal by terminal, for the terminal intended to receive the data, to account for differences in the wireless channel conditions of different terminals 110.

During stage (F), the data center 102 can determine a data transfer rate for transmitting the forward channel data to the gateway 106 over the backhaul network 104. The data transfer rate can be set or managed as a rate in terms of symbols of forward channel data transferred per second. In general, the data center 102 attempts to align its data transfer rate with the throughput capability of the gateway 106 on the feeder link channel to the satellite 108. For example, if the gateway 106 has a channel that transmits at 200 Msps, then the initial data transfer rate from the data center 102 to the gateway 106 over the backhaul network 104 can also be 200 Msps of forward channel data. The data center 102 can retrieve a designated transmission symbol rate from a file or memory that indicates the initial transmission symbol rate to be used when the system 100 is initially utilized. In some implementations, the CRO module 116 can communicate with the gateway 106, e.g., with the flow control module 122, to determine the gateway's wireless channel transmission symbol rate and thus the initial symbol rate for backhaul network transmission.

The flow control module 122 at the gateway 106 can provide information to the data center 102 to help the data center 102 can adjust its data transfer rate over the backhaul network 104. For example, the gateway 106 may send a FC message 134 to initiate the process of sending data to the gateway 106 or to provide status information after streaming of data to the gateway 106 over the network 104 has already begun. The FC message 134 in the example includes information about the data buffer 124, for example, the target buffer utilization level 127, the measured buffer utilization level, data identifying the last packet received by the flow control module 122 (e.g., the packet most recently added to the data buffer 124 when the FC message 134 was generated), and data indicating the duration of the FCI.

The CRO module 116 uses the information in the FC message 134 to determine an appropriate backhaul data transfer rate and whether adjustment to the backhaul data transfer rate is appropriate. One way that the CRO module 116 can do this is to determine a difference between the measured buffer level and the target buffer level. When the measured buffer level is less than the target buffer level, the backhaul data transfer rate should be increased so the data buffer can accumulate more data. When the measured buffer level is greater than the target buffer level, the backhaul data transfer rate should be decreased so that the amount of buffered data decreases toward the target buffer level. The CRO module 116 can use the difference between the measured buffer utilization level and the target buffer utilization level 127 to determine a factor or adjustment measure indicating how much to adjust the data transfer rate over the backhaul link. For example, the CRO module 116 can calculate an adjustment value that represents an amount that the data transfer rate should change over the course of a predetermined number of FCIs. For example, the adjustment value can indicate an amount to change the backhaul data transfer rate so that the buffer utilization level reaches the target buffer utilization level 127 in 1, 2, 4, 10, or some other predetermined number of FCIs. The adjustment value can represent a "delta" or percentage change with respect to the wireless channel's symbol rate (e.g., 200 Msps) that would bring the buffer utilization level to the target utilization level 127 in the desired number of FCI periods.

The CRO module 116 can use data extracted from the FC message 134 to calculate an adjustment value to be used for adjusting the initial designated symbol rate using the following equation (2):

$$\text{adjustment value} = \frac{\text{target buffer utilization level (ms) -- measured buffer level (ms)}}{\text{Flow Control Interval duration (ms)}} \quad (2)$$

In equation (2), the CRO module 116 calculates the adjustment value for the backhaul data transfer rate using the difference between the target buffer utilization level 127 in ms the current measured buffer level in ms. In this case, the buffer utilization represents the amount of transmission time needed to transmit the data in the data buffer 124. In other words, a buffer utilization level of 10 ms represents a storage of an amount of forward channel data in the data buffer 124 that would take 10 ms to transmit at the fixed symbol rate of the corresponding wireless channel. The difference between the target buffer utilization level 127 and measured buffer utilization level is then divided by the FCI duration. This results in an adjustment value that, when used to adjust the backhaul data transfer rate, is calculated to bring the buffer utilization level to the target buffer utilization level 127 over the course of one FCI. Initially, when the buffer is empty, the measured buffer level is 0 ms (e.g., an amount of data that would require 0 ms to transmit). In the example, the target buffer utilization level 127 is 10 ms (based on a maximum jitter of 10 ms), and the FCI duration is set to 500 ms. As a result, the adjustment value for the backhaul data transfer rate is calculated as follows and results in a percentage change that should be applied to the most recent backhaul data transfer rate used:

$$\text{adjustment value} = \frac{10 \text{ ms} - 0 \text{ ms}}{500 \text{ ms}} = 2.0\%$$

The CRO module 116 can calculate an adjusted backhaul data transfer rate from the data center 102 using the adjustment value calculated using equation (2). The adjusted backhaul data transfer rate can be calculated using equation (3) below. This particular example uses the initial backhaul data transfer rate of 200 Msps and the determined adjustment value of 2.0%.

$$\text{Adjusted backhaul data transfer rate} = \text{Backhaul Data Transfer Rate} + \quad (3)$$
$$(\text{Backhaul Data Transfer Rate} * \text{Adjustment Value})$$

Adjusted backhaul data transfer rate =

$$200 \, Msps + 200 \, Msps * 2.0\% = 204 \, Msps$$

The backhaul data transfer rate represents the rate of transmission for forward channel data payload contents, excluding packet headers and other overhead for transmission on the backhaul network 104. The backhaul data transfer rate can be quantified in terms of symbols to be transmitted in the satellite communication network (e.g., on the feeder link) because the data buffer 124 stores and accounts for buffered data in terms of symbols to be transmitted. Accordingly, the backhaul data transfer rate does not refer to the rate of total bits and bytes transferred over the backhaul network 104, but instead can represent the rate that symbols for forward channel transmission in the satellite network are transferred over the backhaul network 104. In this way, measuring data transfer as a symbol rate represents what the forward channel of the satellite network can actually send. As noted above, the amount of data (e.g., number of bits) per symbol varies with modulation, and systems may switch modulation schemes over time, but the CRO MODULE 116 accounts for the modulation and coding schemes used when preparing the forward channel data for transmission over the backhaul network 104.

In the example, the FC message 134, the data buffer 124, and the adjusted backhaul data transfer rate relate to a single channel, but the same techniques can be used for each of multiple channels. For example, each channel can have its own corresponding data buffer, target buffer utilization level 127, and FC message data, and a corresponding backhaul data transfer rate can be calculated for each channel's forward channel data stream.

During stage (G), the CRO module 116 organizes forward channel data into packets. The CRO module 116 can also calculate and track the amount of satellite network symbols represented by the forward channel data in the various packets sent over the backhaul network 104. As discussed above, transmission parameters are determined and assigned for different forward channel data during stage (E). When FEC encoding is applied, the CRO MODULE 116 can perform the FEC encoding to map the bits to be transmitted (e.g., user data bits) to one or more FEC-encoded bits to be transmitted as forward channel data, according to the transmission parameters determined for the data. The transmission parameters may be assigned differently for different physical channels and/or for different destination terminals 110, are these used by the CRO MODULE 116 to account for the forward channel data in terms of symbols to be transmitted wirelessly in the satellite network. For some types of satellite communication channels, the same modulation and coding parameters are used for different recipient terminals 110. In others, the modulation and coding may vary from one terminal 110 to another and from one time to the next. For example, adaptive coding and modulation (ACM) can be used.

The CRO module 116 can calculate a packet size to use for sending forward channel data to the gateway 106. In some implementations, the CRO module 116 can calculate the packet size to use based on any of various parameters. The parameters can include, for example, the adjusted backhaul data transfer rate, a size of the data to be transmitted in bits or bytes, a modulation scheme used, a number of data components used in each packet, and other data types. The CRO module 116 can determine an appropriate packet size and instruct the router 118 to transmit data to the gateway 106 using the adjusted symbol rate and the data packet size. The CRO module 116 can change the packet size used from time to time as parameters or conditions of the network change.

The backhaul network 104 can be a packet-based network, and as a result the data stream of forward channel data that is provided can be packaged into packets. Each data packet can be structured to have, for example, a header section, a payload or data section, an error detection and correction section, and one or more other sections. The header section of each packet can include various fields or flags where control information can be included for the corresponding packet. The header section can include, for example, parity information, type of modulation, type of coding, and other types of information being used for the corresponding packet. The payload or data section of the packet can include one or more blocks of data that of a size the CRO determines to be appropriate. In some implementations, the payload data can be encoded, encrypted, scrambled, interleaved, or otherwise protected. In the packet, the data section can be concatenated to an end of the header section. The error detection and correction section can include one or more blocks of data to facilitate error detection and correction. For example, the error detection and correction section can include parity information for the data section. In some implementations, the error detection and correction section can be concatenated to an end of the data section.

In some implementations, the CRO module 116 generates packets of forward channel data with a packet size or payload size of approximately 2 kilobytes (KB). In some implementations, the packets are generated to have a size or payload size of no more than a maximum size, such as 16 kB.

The CRO module 116 can determine and track, for each packet, the number of symbols to be transmitted in the satellite communication network that are represented by that packet. For example, using the MODCOD parameters determined in stage (E), the CRO module 116 can determine the number of symbols worth of forward channel data are included in the various packets. For example, if the CRO module 116 determines that a modulation scheme of QPSK is being used for a particular wireless channel, e.g., QPSK provides 2 bps, then the CRO module 116 can calculate the payload size in symbols by converting the number of payload bits to the number of symbols. Thus, a packet with a payload of 2 kB, which is assigned to be transmitted in the satellite network with a modulation scheme of QPSK represents 1 Kilo-symbols (KSyms) of forward channel data. As another example, a packet carrying 2 kB of payload data being transmitted with a modulation scheme of 16 QAM that provides 4 bps represents 0.5 KSyms of forward channel data.

During stage (H), the CRO module 116 adjusts the data transfer rate over the backhaul network 104. In the previous stages, the target symbol rate for data transfer is determined (stage (F)), and the forward channel data is organized into packets with known payload symbol amounts (stage (G)). As a result, the CRO MODULE 116 can send the packets at a rate that achieves the desired data transfer rate (e.g., symbol rate of forward channel data).

In the example, the CRO module 116 is switching from the previous rate of 200 Msps to the new rate of 204 Msps that was set based on the flow control message 134 from the gateway 106. The CRO MODULE 116 adjusts the flow of packets it provides to the router 118 to achieve the increased symbol rate. For example, if the packets have a consistent payload size in symbols, the CRO MODULE 116 can generate and send the packets at a 2% faster rate to achieve the new symbol rate. As another example, the CRO MODULE 116 may increase the payload size (in terms of symbols of forward channel data) of the packets by 2% and maintain the same rate of generating and sending packets. As another example, the CRO MODULE 116 may vary the packet payload size and the rate that packets are sent to be transmitted over the backhaul network 104.

In some implementations, the CRO module 116 can cooperate or coordinate with the router 118 or other networking devices to achieve a desired symbol rate. For example, the system may rely on the router 118 to manage the symbol rate of data transfer over the backhaul network 104 and send data at the desired symbol rate. For example, the packet headers of the packets or metadata accompanying the packets may indicate the amount of symbols represented by each packet. The CRO MODULE 116 may instruct the router 118 the desired symbol rate for transmission over the backhaul network 104, such as in a message instructing to use the new symbol rate of 204 Msps. The router 118 may then transmit the packets it receives from the CRO module 116 at the symbol rate instructed by the CRO module 116. The router 118 may have a buffer that it uses to temporarily store packets to achieve the desired symbol rate for transmission over the backhaul network 104.

During stage (I), the router 118 receives the stream of packets from the CRO MODULE 116 and sends the data packets 119 over the backhaul network 104 to the gateway 106. In some implementations, the CRO MODULE 116 sends a message or other instructions to the router 118 to indicate the data transfer rate, in terms of symbols to be transmitted in the satellite network, to be used. The router 118 can the send the packets 119 at the symbol rate specified, using data in the packet headers or metadata outside the packets that indicates the amount of transmittable symbols represented by the respective packets.

The router 118 can transmit the packets 119 to the gateway 106 corresponding to the wireless channel that the packets 119 correspond to. In some implementations, the data center 102 may provide data for multiple wireless channels provided using different gateways. As a result, the data center 102 can include multiple CRO modules that each handle different data streams for different wireless channels or gateways. In addition, the data center 102 may have connections through multiple backhaul networks or connections through multiple different links or paths through the backhaul network 104, and the data center 102 may select from among the different networks and/or connections to provide forward channel data to the correct destination gateway efficiently.

During stage (J), the gateway 106 receives the transmitted data packets 119 from the router 118 of the data center 102. For example, a router 120 or other networking component at the gateway 106 can receive the transmitted data packets 119 over the one or more selected backhaul links on the backhaul network 104 from the data center 102. The router 120 at the gateway 106 can receive the transmitted data packets 119 and extract information from the transmitted data packets 119. The router 120 or other networking components can record the time of receipt of the respective packets 119, which can be used to measure latency and latency jitter.

For example, based on the header information in the packets, the gateway 106 can determine which channel the packets 119 correspond, and thus which buffer 124 should be used to store the forward channel data in the payloads of the data packets 119. Each packet header can include an identifier or other data that specifies the channel on which it is to be transmitted, and the gateway 106 can store information indicating the correspondence between channel identifiers and buffers 124. The gateway 106 extracts the forward channel data from the packets 119 and stores the forward channel data in the buffer 124 to which the data packets 119 are determined to correspond. As discussed above, FEC encoding of the data to be send can be performed at the data center 102 before transmission over the backhaul network 104, so the forward channel data can be FEC-encoded data. This is not required, however, and as an alternative the gateway 106 can perform FEC encoding on the received data in the payloads of the packets 119 based on transmission parameters indicated in the packets 119, either before storing the data in the buffer 124 or after retrieving data from the buffer 124 (e.g., just prior to modulation and transmission). The modulations to apply can be specified in, for example, the headers of the data packets 119. In some implementations, each packet is generated to include data to be transmitted with a single modulation. For ACM, the data can be split into packets in which different packets can have different modulations. The gateway 106 stores and tracks which modulations are assigned to be used for the respective data stored in the buffer 124, so that the symbols can be transmitted with the correct modulations.

The gateway 106 can extract other types of information from the header information for each of the data packets 119, such as a time of transmission of the data packet from the router 118 (e.g., a timestamp), a packet number (e.g., indicating the position of the packet in a sequence of packets), and other information relating to a particular data packet 119. As discussed, above the time of receipt of each of the respective packets 119 is also recorded.

As discussed above, different data streams can be provided over the backhaul network 104 for different channels, each of which can have data stored in a separate buffer that has its status (e.g., utilization level) independently tracked, so the data transfer rate over the backhaul network 104 can be determined separately for each channel. These channels can be different physical wireless channels, such as different feeder links each having a different frequency band and/or polarization or different satellite beams for transmission (which may or may not have a one-to-one correspondence with the feeder link channels from the gateway 106 to the satellite 108). In addition, or as an alternative, data for different categories or priority classes (e.g., QoS classes) can be treated as separate channels, e.g., virtual channels, even though they may be combined in the same wireless channel. The data center 102 can perform classification of forward channel data to be sent, such as to assign QoS classes, and then either tag the data with indicators of the assigned QoS classes or send data from different QoS classes in separate data streams (e.g., using a separate stream identifier or channel identifier to distinguish).

During stage (K), the flow control module 122 analyzes information about the packets 119 to determine characteristics of the backhaul network. For example, the flow control module 122 can determine a latency of the connection over the backhaul network using the header information from some or all of the packets 119 received. For example, the header information can specify a time representing a transmission time of the packet. The flow control module 122 can also access a time of receipt for the packet, as recorded by the router 120 or other networking components. The flow control module 122 can determine the difference between the packet's transmission time at the router 118 and the packet's reception time at the router 120 to determine the latency for sending the packet over the backhaul network 104. The flow control module 122 can perform this calculation for many different packets 119, for some or all of the packets 119 received during a flow control interval (FCI), which can have a duration of, for example, 1 second, 500 ms, 250 ms, etc.

The flow control module 122 can analyze the latency for the backhaul network that occurred over a period of time, e.g., the most recently ended FCI. For example, the flow control module 122 can determine an average latency over the FCI and an amount of latency jitter experienced over the FCI. As discussed above, latency jitter is a measure of the variation in latency of the backhaul link, such as a difference between (i) the highest latency experienced by a packet received during the period and (ii) the lowest latency experienced by a packet during the period. As will be further described below, the flow control module 122 can determine adjustments for various parameters, including the data transfer rate over the backhaul network 104 (e.g., symbol rate) and the target utilization of the buffer 124, according to the determined characteristics of the backhaul link, such as values for latency and latency jitter.

As will be discussed in further detail with respect to FIGS. 1B and 1C, the gateway 106 can use the characteristics of the backhaul network 104 (e.g., latency and latency jitter) to adjust the target buffer utilization. As discussed above, the target buffer utilization level 127 can be set to correspond to the amount of expected or historical latency jitter, which can be approximately half the total size allocated for the buffer 124. As packets 119 are received and new latency and latency jitter values are calculated to represent current or recent conditions of the backhaul network 104, the flow control module 122 can calculate a new target buffer utilization level 127.

The gateway 106 also provides additional information to the data center 102 (e.g., over the backhaul network 104) to facilitate adjustment of the data transfer rate (e.g., symbol rate) for transferring forward channel data over the backhaul network 104. For example, for each FCI, the gateway 106 can send a flow control message that indicates the updated status of the buffer 124 and/or the backhaul network 104. For example, the flow control message can indicate the buffer utilization and the target buffer utilization, or can indicate a difference between the buffer utilization and the target buffer utilization. In addition, the flow control message can include backhaul network characteristics (e.g., average latency over the FCI, jitter over the FCI, etc.) and an packet identifier for the latest packet received (e.g., latest in the packet sequence) received and entered into the data buffer 124 as of the end of the measurement period (e.g., end of the FCI). This and other information provided in the message can be used by the data center 102 to determine whether to adjust the data transfer rate over the backhaul network and what the new data transfer rate should be. For example, based on the data in a flow control message, the data center 102 can compare the actual buffer utilization measured with the target buffer utilization level 127 and adjust the data transfer rate accordingly.

During stage (L), the gateway 106 sends data extracted from the data buffer 124 to the satellite 108 for retransmission to the terminals 110. In the example, the gateway 106 is configured to transmit data on a feeder link to the satellite 108 at a consistent, predetermined symbol rate. In the illustrated example, the symbol rate is held constant at 200 Msps. The gateway 106 can include, for example, a data consumer 126 to extract and process data from the buffer 124 (e.g., to modulate the data to an RF signal) and a TX/RX system 128 to transmit the data (e.g., processing the RF signal to upconvert, amplify, and output via an antenna).

In some implementations, each channel can be associated with a data consumer 126 that extracts and processes buffered data from the corresponding data buffer 124 of the channel, and prepares the extracted data to be transmitted.

The data consumer 126 can be one or more software components and/or one or more hardware components, e.g., one or more computing devices, that extract data from the data buffer 124 so the gateway 106 transmits at the predetermined symbol rate. In many cases, the rate data is extracted from the data buffer 124 is approximately the same as the symbol rate transmitted for the channel as transmitted from the TX/RX system 128 over the satellite 108. The data consumer 126 can extract data from the data buffer 124, which may store data using, for example, a first-in, first-out (FIFO) manner or in another manner. Even if the symbol rate for wireless transmission is held constant, the symbol rate for transferring forward channel data from the data center 102 to the gateway 106 may preferably be variable and can adjust over time, to manage the buffer utilization of the buffer 124 (e.g., to minimize added latency from buffering while still buffering sufficient data to avoid buffer underruns given the latency jitter of the backhaul network 104).

In the illustrated example, the data consumer 126 is a modulator. The modulator can maps or translates data extracted from the data buffer 124 into RF signals for the symbol that represents data being transmitted. After modulation the signals can be further processed by the TX/RX system 128, which can include various components that enable transmission and reception. For example, the TX/RX system 128 of the gateway 106 can each include one or more transmitters. The one or more transmitters can include a radio frequency (RF) transmit chain that up-conversion, amplification, filtering, and other processes to prepare the RF signals for transmission. The TX/RX system 128 can also include one or more antennas that can transmit the RF signals of the symbols being transmitted.

Additionally, the TX/RX system 128 can include one or more receivers. The one or more receivers can include an RF receive chain that performs down-conversion, demodulation, and decoding of received symbols. Each RF receive chain can include one or more routers for transmitting the decoded data to the data center 102 over the backhaul network 104. The TX/RX system 128 can also include one or more antennas that can receive the symbols transmitted by the terminals 110 over the satellite 108.

In some implementations, the TX/RX system 128 can include an RF transmit chain for each channel. In this manner, a data consumer 126 for a channel can provide modulated RF signals representing data extracted from the data buffer 124 of the channel to the RF transmit chain for further processing and transmission.

In some implementations, the TX/RX system 128 transmits the forward channel data over the satellite 108 to the terminals 110 using the fixed transmission symbol rate of the wireless channel. The transmission symbol rate over the gateway 106 to the terminals 110 over the satellite 108 may remain fixed, even though the symbol rate for data transfer over the backhaul network 104 may vary. The gateway 106 and the data center 102 can work together to adjust the backhaul network symbol rate, providing what is, in effect, a feedback mechanism to place the buffer utilization level at or near the target buffer utilization level 127 amid changing conditions. For example, with input from the gateway 106 about the status of the data buffer 124, the data center 102 adjusts the backhaul data transfer rate so the buffer utilization will rise or fall toward the target buffer utilization level 127. In addition, the gateway 106 repeatedly measures the latency jitter and adjusts the target buffer utilization level 127 as needed, and the data center 102 further adjusts the backhaul data transfer rate toward the new target buffer utilization level 127.

The techniques discussed with respect to FIG. 1A can be performed in an ongoing and repeated manner, with may or all of the described processes being performed concurrently. In steady-state operation, the data center 102 is concurrently receiving new forward channel data, organizing it into packets, and sending the packets in a data stream over the backhaul network 104. The data center 102 periodically receives flow control messages from the gateway 106, and based on those messages changes the symbol rate of transfer for the ongoing forward channel data stream to provide or maintain buffer utilization of the data buffer 124 at or near the target buffer utilization level. Meanwhile, the gateway 106 is concurrently receiving the packets 119 of the data stream and entering the forward channel data of the packet payloads into the buffer 124, while also extracting data from the buffer 124 and transmitting the extracted data in the satellite communication network. Thus, the gateway 106 is concurrently filling the buffer 124 with incoming data received over the backhaul network 104 and emptying the data buffer 124 to transmit buffered data over the satellite communication network. Amid this process, the gateway 106 periodically analyzes the backhaul network latency characteristics and sends the latency measures and buffer status in flow control messages to the data center 102, so the symbol rate for backhaul network transfers can be fine-tuned. The gateway 106 also uses the updated determination of latency characteristics to update the target buffer utilization level, which in many cases is also indicated in the flow control messages.

Figure 1B:
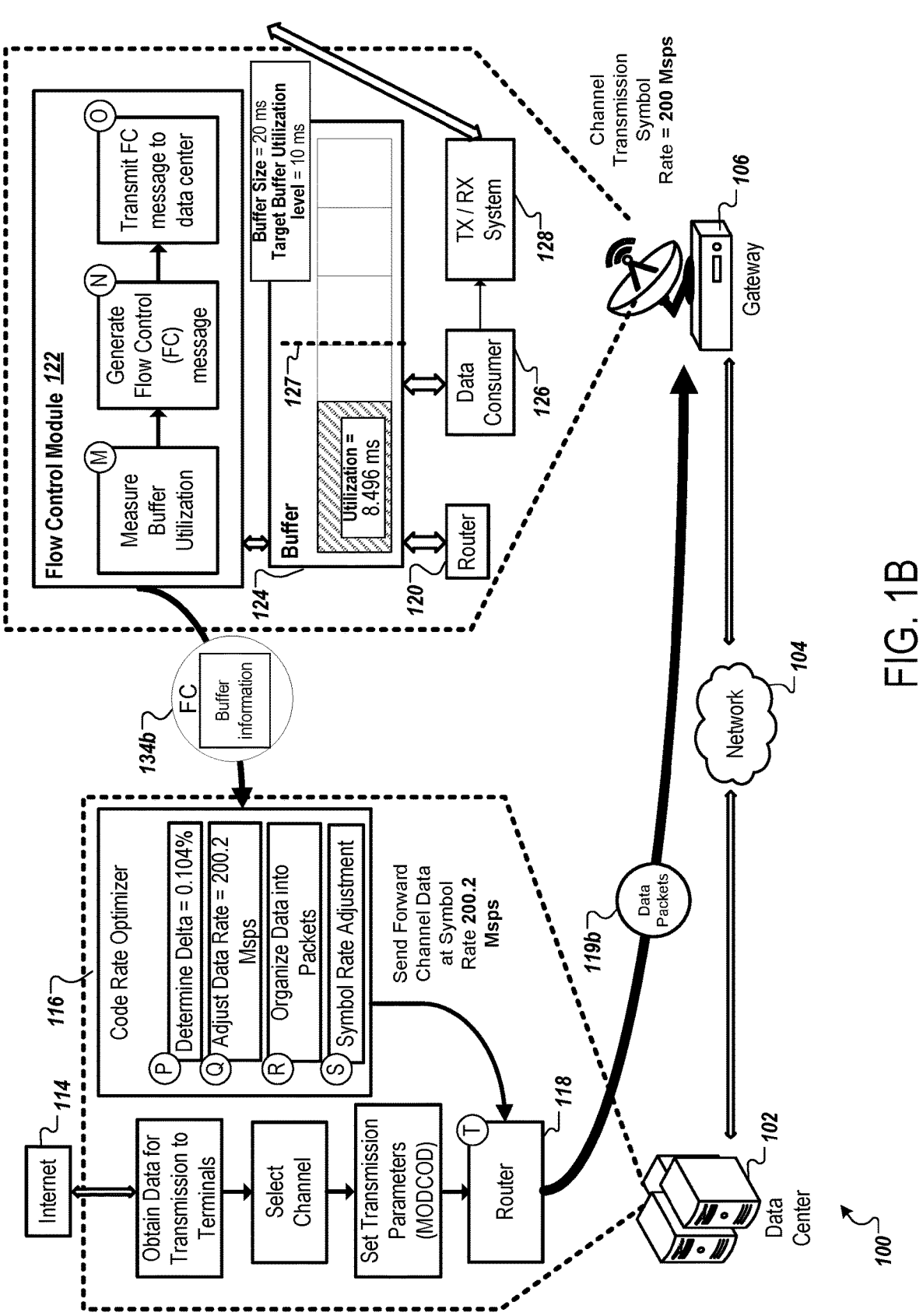

FIG. 1B is a diagram that shows an example of additional operations of the system 100. FIG. 1B illustrates various operations in stages (M) through (T), which can be performed in the sequence indicated, in another sequence, and potentially with fewer stages or with more stages than are illustrated. In the illustrated example, the stages (M) through (T) occur after the stages (A) through (L) of FIG. 1A and continue the example of FIG. 1A.

With the system 100 operating in the example of FIG. 1A, the data center 102 provides forward channel data to the gateway 106 at a rate of 204 Msps, which exceeds the transmission rate of 200 Msps for the corresponding channel. As a result, the amount of buffered data in the data buffer 124 increases, as intended, to bring the buffer utilization level up to the target buffer utilization level 127.

The operations shown in FIG. 1B continue the example with an additional flow control message 134b and a further adjustment of the backhaul data transfer rate. The flow control module 122 periodically determines the buffer utilization level (e.g., fill depth or amount of data buffered) of the data buffer 124 and for each FCI generates a flow control message indicating the status of the buffer 124. This enables the data center 102 to determine a change to the backhaul data transfer rate that will bring the buffer utilization level closer to the target buffer utilization level 127.

The flow control module 122 can perform flow control analysis at a predetermined flow control interval (FCI), such as every 100 ms, 250 ms, 500 ms, 1 second, or at another time interval. The FCI can be set by a designer of system 100. In some implementations, the FCI can be set based on a proximity of the gateway 106 and the data center 102. The flow control analysis performed for each repetition of the FCI can include, for example, determining the buffer utilization of the buffer 124, generating and sending a flow control message including buffer information. The flow control analysis can also include determining the latency characteristics of the backhaul network 104 (e.g., calculating updated latency and latency jitter), as well as determining and potentially adjusting the target buffer utilization level 127.

During stage (M), the flow control module 122 measures a depth or utilization of the data buffer 124 at the specified interval. In some examples, the flow control module 122 can query the data buffer 124 to request the utilization or amount of data stored (e.g., fill depth). The data buffer 124 can return the utilization as, for example, an amount of stored data measured in terms of transmittable symbols, as a percentage of buffer capacity filled, or another appropriate measure. As discussed above, the forward channel data is tracked and stored in terms of symbols that are wirelessly transmittable in the satellite communication network, which can take into account the differing number of bits per symbol that result from using different modulations. The CRO module 116 has determined the modulations to use for forward channel data and has organized it into symbol-sized chunks, which continue to be tracked as symbol-sized elements in the data buffer 124.

During stage (N), the flow control module 122 generates a FC message 134b to provide to the data center 102. For example, the flow control module 122 can generate the FC message 134 that includes the information for the CRO module 116 at the data center 102 to calculate a new backhaul data transfer rate (e.g., a symbol rate for forward channel data over the backhaul network 104) and adjust the symbol rate at the router 118 to the new transmission symbol rate for subsequent transmissions. The FC message 134b can include a variety of information that the data center 102 can use to calculate and adjust the transmission symbol rate.

For example, the FC message 134b can include the measured utilization level of the data buffer 124 determined during stage (M), data indicating the target buffer utilization level 127, data indicating the last packet received by the flow control module 122 when the flow control module 122 measured the level of the data buffer 124, and data indicating the duration of the FCI period. In many cases, the FC message 134b for a FCI can indicate the last packet received by the flow control module 122 (e.g., the last packet of forward channel data entered into the buffer 124 by the end of the most recent FCI). The last packet can be specified using, for example, a packet or code block number, a timestamp associated with the packet or code block, and other data that identifies the packet. Typically, packets received over the backhaul link each have an identifier, and the identifiers are assigned in a sequence. As described below, the flow control module 122 can provide the packet identifier for the latest packet received, e.g., the highest number in the sequence, which the data center 102 can use to calculate an adjusted backhaul data transfer rate.

During stage (O), the flow control module 122 transmits the generated FC message 134b to the data center 102 over the backhaul network 104. The FC message 134b includes the data for the data center 102 to calculate a new backhaul data transfer rate for subsequent transfers of forward channel data.

During stage (P), the CRO module 116 at the data center 102 extracts data from the received FC message 134b. The extracted data can include, for example, the measured level of the data buffer 124 determined during stage (M), data indicating the target buffer utilization level 127, data indicating the last packet received by the flow control module 122 when the flow control module 122 measured the level of the data buffer 124, and data indicating the duration of the FCI. This process can be performed using the techniques described for stage (F) of FIG. 1A.

In general, the CRO module 116 uses the difference between the measured utilization level and the target utilization level 127 to determine how to adjust the backhaul network transfer rate. For example, the CRO module 116 compares the measured buffer level of data buffer 124 to the target buffer utilization level 127. The CRO module 116 can use the data extracted from the FC message 134b, e.g., the measured level of the data buffer 124 and the data indicating the target buffer utilization level 127, to determine an adjustment value to indicate how to change the backhaul data transfer rate. The adjustment value can be a delta or percentage difference representing the amount that the current backhaul data transfer rate needs to be changed in order to adjust the buffer utilization level to the target buffer utilization level 127 within a predetermined number of FCI periods (e.g., 1 FCI period, 2 FCI periods, 5 FCI periods, etc.).

As shown in Equation (2) above, one way to calculate an adjustment value can be to determine difference between the target buffer utilization level 127 and the measured buffer level, and to divide by the FCI duration. However, simply using the measured buffer level in the calculation may not be entirely accurate, because the buffer utilization may continue to change in the time between generation of the FC message 134b and the receipt and processing by the data center 102. To provide an even more accurate adjustment value, the CRO module 116 can use the measured buffer utilization level in the FC message 134b to determine an estimated buffer utilization level that is expected to be present at the time that the CRO module 116 is performing the flow control calculations. Generating and using the estimated buffer utilization level can account for, among other factors, the latency in transferring the FC message 134b to the data center 102, and can allow adjustments to the backhaul data transfer rate to more closely align buffer utilization to the target buffer utilization level.

Consider an example in which the FC message 134b indicates that the measured level of the data buffer 124 is 1,699,250 symbols, which represents 8.496 ms of transmission time, and the target buffer utilization level 127 is 2,000,000 symbols, which represents 10 ms of transmission time. The last packet entered in the data buffer 124 in the FCI corresponding to the FC message 134b has a label or packet sequence number of "Num1," which is identified in the FC message 134b.

To estimate the current buffer utilization level, the CRO module 116 can the number of symbols, Y, of forward channel data sent by the data center 102 in the period between the generation of the FC message 134b by the gateway 106 and receipt of the FC message 134b by the data center 102. To determine the number of symbols, Y, the CRO module 116 may first determine the number of packets (or code blocks) transmitted in this period, and then translate from the number of packets or set of packets to the number of symbols. The CRO module 116 retrieves the label or packet sequence number (e.g., a packet identifier) for the packet most recently sent by the data center 102 at the time the FC message 134b was received. This packet sequence number is represented as "Num2." The CRO module 116 then determines the number of packets that the data center 102 sent after the FC message 134b was generated as, for example, the difference between the patent sequence numbers Num2 and Num1. If the packets each include a consistent number of symbols of forward channel data, then the number of symbols, Y, of forward channel data transmitted over the backhaul between generation and receipt of the FC message 134b can be determined by multiplying the number of packets by the number of symbols per packet. If a variable number of symbols is provided per packet, then the CRO module 116 can use records of the number of symbols for each of the packets in the sequence ranging from Num1 to Num2, and add those amounts together to obtain the number of symbols, Y, of forward channel data transmitted over the backhaul between generation and receipt of the FC message 134*b*. In the example, the number of symbols, Y, between generation and receipt of the FC message 134*b* is 10 MSyms.

The CRO module 116 estimates the current buffer utilization by adding the measured buffer utilization level from the FC message 134*b* with a portion of the symbols, Y, expected to have increased or decreased the buffer level during the period between generation and receipt of the FC message 134*b*. For example, of the symbols, Y, most are expected to contribute to filling the slots for transmission at the symbol rate of the wireless channel (e.g., 200 MSps). However, where an previous adjustment factor or delta was used, the actual backhaul data transfer rate will be different, leading to an expected change in buffer utilization. For example, the previous adjustment value or delta is 2.0%, and so roughly 2.0% of the symbols, Y, are expected to contribute to increasing the buffer utilization level. A negative adjustment value or delta would conversely be expected to decrease the buffer utilization level. In some implementations, the adjustment value or delta itself can be used to estimate the fraction of the symbols, Y, that add to the steady-state buffer utilization (e.g., adjustment value*Y). Nevertheless, other techniques can be used to make a more conservative estimate, such as in Equation (4) below, where the fraction of symbols, Y, that are expected add to the steady-state buffer utilization is based on the adjustment value divided by the sum one plus the adjustment value. Equation (5) shows an example of Equation (4) having the particular values of the example of FIG. 1B inserted.

$$\text{Estimated Buffer Utilization} = \tag{4}$$
$$\text{Measured Buffer Level} + \left(\frac{adj.\,val.}{1+adj.\,val}*Y\right)$$

$$\text{Estimated Buffer Utilization} =$$
$$1{,}699{,}250 \text{ symbols} + \left(\frac{0.02}{1+0.02}*10{,}000{,}000 \text{ symbols}\right) =$$
$$1{,}699{,}250 \text{ symbols} + 196{,}078 \text{ symbols} = 1{,}895{,}328 \text{ symbols}$$

As shown above, the CRO module 116 can add the buffer level measurement of 1,699,250 symbols to 196,078 symbols to be 1,895,328 symbols or 1.895 MSyms. The value of 196,078 symbols is calculated from the adjustment value or delta determined from stage (F) in FIG. 1A, e.g., 2.0%. The CRO module 116 can estimate the new buffer level or estimated buffer utilization at the gateway 106 to be 1.895 MSyms. This is greater than the measured 1.699 MSyms indicated in the FC message 134*b*, showing that the continued transfer of forward channel data over the backhaul network 104 while the FC message 134*b* was in transit to the data center 102 is expected to have allowed the buffer 124 to have filled further. The estimated buffer utilization level is thus more accurate for the current time than the measured buffer utilization level. Note that the estimated buffer level need not be exactly accurate to be a useful improvement for calculating the new adjustment value.

The CRO module 116 can express the estimated current buffer level in an amount of time, such as dividing the estimated buffer level (as expressed in symbols) by the transmission symbol rate for wireless channel of the satellite network that the forward channel data is transmitted on. For example, the CRO module 116 can determine the estimated buffer level with respect to time using equation (6) below:

$$\text{Estimated Buffer Level (in Time)} = \tag{6}$$
$$\frac{\text{Estimated Current Buffer Level}}{\text{Wireless Channel Symbol Rate}} = \frac{1{,}895{,}328 \text{ symbols}}{200\,Msps} = 9.48 \text{ ms}$$

The CRO module 116 can determine a new adjustment rate or delta using the difference between the target buffer utilization level 127 expressed in time from the estimated buffer level expressed in time. For example, the CRO module 116 can calculate the new adjustment value or delta using the estimated buffer level in time, using equation (7) below:

$$\text{New Adjustment Value} = \frac{\begin{array}{c}\text{target buffer utilization level (ms)} - \\ \text{estimated current buffer level (ms)}\end{array}}{\text{Flow Control Interval duration (ms)}} = \tag{7}$$
$$\frac{10 \text{ ms} - 9.48 \text{ ms}}{500 \text{ ms}}*100\% = 0.104\%$$

Equation (7) is similar to equation (2) above, but uses the estimated current buffer utilization level instead of the measured buffer utilization level. The CRO module 116 uses the target buffer utilization level 127, e.g., 10 ms, the estimated buffer level as expressed in time, e.g., 9.489 ms, and the FCI period at the gateway 106, e.g., 500 ms. This results in an adjustment value or delta of 0.104% which is much less than the previous adjustment value or delta of 2.0%. This result is appropriate because the buffer has filled significantly over the previous FCI period, and so the buffer utilization is much closer to the target buffer utilization level 127 than when the buffer 124 was empty. Consequently, although the new adjustment value greater than zero shows that the buffer utilization should still be increased, it does not need to increase as much or as quickly as calculated previously.

During stage (Q), the CRO module 116 determines the adjusted backhaul data transfer rate (e.g., symbol rate for backhaul transfer of forward channel data to the gateway 106). For example, the CRO module 116 can calculate the new, adjusted backhaul data transfer rate using the new adjustment value or delta calculated using equation (7). The new adjustment value or delta indicates an amount of change relative to the transmission symbol rate for the channel that draws data from the buffer 124, which in the example is 200 Msps.

For example, the CRO module 116 can use the current transmission symbol rate for the corresponding virtual channel, e.g., for the data buffer 124, and determine the adjusted transmission symbol rate. For example, the CRO module 116 can determine the adjusted transmission symbol rate using the equation (8), and application of that equation to the specific example illustrated in equation (9):

$$\text{Adjusted Symbol Rate} = \text{Transmission Symbol Rate} + \qquad (8)$$

$$\text{Transmission Symbol Rate} * \text{Delta percentage}$$

$$\text{Adjusted Symbol Rate} = \qquad\qquad (9)$$

$$200\frac{MSym}{s} + 200\frac{MSym}{s} * 0.104\% = 200.2 MSym/s$$

As shown above, the CRO module 116 can determine the adjusted transmission symbol rate by adjusting the transmission symbol rate for the channel supported by the data buffer 124 by the new adjustment value or delta. For example, the channel's transmission symbol rate is 200 Msps and the delta percentage is 0.104%. The CRO module 116 can adjust the current transmission symbol rate of the router 118 by a factor of the adjusted delta percentage. The resulting value is 200.2 Msps, which represents the new backhaul data transfer rate for transmitting forward channel data to the gateway 106.

During stage (R), the CRO module 116 can organizes forward channel data into packets, as described above for stage (G). As discussed above, the CRO module 116 can determine transmission parameters for forward channel data and organize and track the number of symbols, accounting for the forward error correction coding, modulation, and other transmission properties to be used. The receipt of forward channel data, organization into packets, and transmission over the backhaul network 104 is an ongoing process, just as the gateway 106 is consistently both filling the buffer 124 and removing data from the buffer 124 to transmitting forward channel data at the consistent wireless transmission symbol rate (e.g., 200 Msps in this example).

During stage(S), the CRO module 116 adjusts the backhaul data transfer rate to the newly calculated value, e.g., 200.2 Msps in this example. The CRO module 116 may achieve this through, for example, adjusting the frequency at which data packets are generated, the size of the data packets, and so on. In some implementations, the CRO module 116 sends instructions to the router 118 so that the router 118 assists in enforcing the new backhaul data transfer rate, such as by adjusting the rate that data packets are sent.

During stage (T), the router 118 sends data packets 119*b* as generated an provided by the CRO module 116 to achieve the new adjusted backhaul data transfer rate, e.g., 200.2 Msps. This can be performed using the techniques described with respect to stage (I) of FIG. 1A.

In some implementations, the flow control module 122 at the gateway 106 can perform some or all of the functions described for stages (P) and (Q). For example, rather than sending buffer information so the data center 102 can calculate the adjustment value or delta and/or the adjusted backhaul data transfer rate, the flow control module 122 can calculate these values itself. In this case, the FC message 134*b* may include the new adjustment rate or delta and/or the adjusted data rate for the data center 102 to use.

Figure 1C:
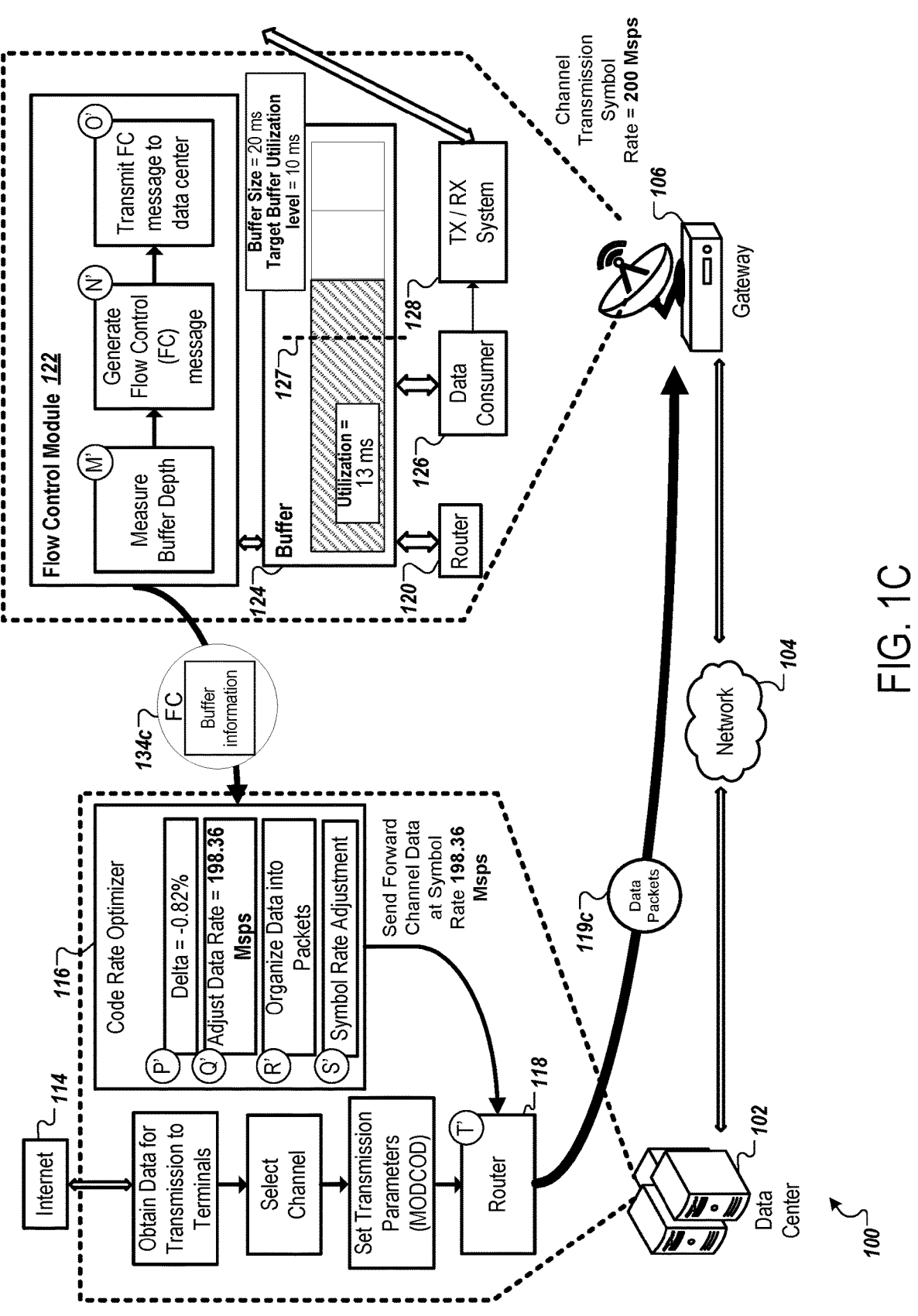

FIG. 1C is a diagram that shows another example of the system 100 for dynamically adjusting data transfer from the data center 102 to the gateway 106. The example shows the same functions of stages (M) through (T) of FIG. 1B, but in another iteration of updating the data flow, for example, after the end of another FCI period at some point after the example shown in FIG. 1B. FIG. 1C illustrates various operations in stages (M') through (T'), which can be performed in the sequence indicated, in another sequence, with additional stages, or with more stages.

During stage (M'), the flow control module 122 measures a depth of the data buffer 124 at the specified interval.

During stage (N'), the flow control module 122 generates an FC message 134*c* to provide to the data center 102. The FC message 134*c* can include various data components, such as the data indicating the target buffer utilization level 127, data indicating the last packet received by the flow control module 122 when the flow control module 122 measured the level of the data buffer 124, and data indicating the FCI period duration.

During stage (O'), the flow control module 122 transmits the generated FC message 134*c* to the data center 102.

During stage (P'), the CRO module 116 receives the FC message 134*c* from the gateway 106 and determines a new adjustment value or delta for setting the backhaul data transfer rate. The CRO module 116 extracts the information from the received FC message 134*c*. The CRO module 116 can use the data extracted from the FC message 134 to determine an updated adjustment value or delta representing a change with respect to the symbol transmission rate of the channel. The new adjustment value or delta can be based on the difference 136 between the measured buffer level of data buffer 124 and the target buffer utilization level 127. Or, as discussed above for stage (P), the new adjustment value or delta can be based on the difference between an updated or estimated current buffer utilization level (determined using the measured buffer level indicated by the FC message 134*c*) and the target buffer utilization level 127.

For example, the CRO module 116 can determine the number of symbols that have been sent over the backhaul network 104 since the last packet the gateway 106 received in the corresponding FCI period, as identified with an identifier or packet sequence number in the FC message 134*c*. In further detail, the CRO module 116 can determine the range or number of packets sent over the backhaul network 104 between a last packet received in the FCI period corresponding to the FC message 134*c*, referred to as $P_c$, and a packet that was most recently sent by the data center 102 (or most recently sent as of the time the FC message 134*c* was received), referred to as $P_d$. The CRO module 116 can determine the number of symbols sent in the range of packets from just after $P_c$ to $P_d$, labeled as number of packets Y.

In the example, the measured buffer utilization indicated by the FC message 130*c* is 2,600,000 symbols or 13 ms of transmittable data (while the target buffer utilization level 127 is 2,000,000 symbols or 10 ms). This shows that the data buffer 124 is filled more than is needed to handle the maximum latency jitter measured for the backhaul network 104, and so the backhaul data transfer rate should be less than the 200 Msps channel transmission rate in the satellite network, so the data buffer 124 becomes less filled and utilization moves toward the target buffer utilization level 127. The amount of forward channel symbols, Y, transmitted since the FC message 134*c* was generated is 9 Msym. In the illustrated example, the adjustment value or delta used in the previous FCI period (e.g., the FCI period corresponding to the FC message 134*c*) is 2.5%. This is different from what is determined for FIG. 1B, and the example of FIG. 1C would occur many FCI periods after the example discussed for FIG. 1B (e.g., potentially with many seconds or minutes or more of operation between the examples of FIG. 1B and FIG. 1C).

Based on these values, the CRO module 116 can determine an estimated current buffer utilization for the data buffer 124 at the gateway 106 using equation (10) and the application of the example data in equation (11) below.

$$\text{Estimated Buffer Utilization} = \tag{10}$$

$$\text{Measured Buffer Level} + \left( \frac{adj.val.}{1 + adj.val} * Y \right)$$

$$\text{Estimated Buffer Utilization} = \tag{11}$$

$$2{,}600{,}000 \ Syms + \left( \frac{0.025}{1 + 0.025} * 9{,}000{,}000 \ \text{symbols} \right) =$$

$$2{,}600{,}000 \ Syms + 219{,}512 = 2{,}819{,}512 \ \text{symbols}$$

As illustrated above, the estimated current buffer utilization level is 2,609,350 symbols, which can be expressed in terms of time (e.g., duration that the 200 Msps transmission rate can be filled) as 13.04 ms, as shown below.

$$\text{Estimated Buffer Level (in Time)} = \tag{12}$$

$$\frac{\text{Estimated Buffer Level (in symbols)}}{\text{Channel Transmission Symbol Rate}} =$$

$$\frac{2{,}819{,}512 \ \text{symbols}}{200 \ \text{Msps}} = 14.1 \ \text{ms}$$

Then, the CRO module 116 can calculate the newly adjusted delta using the estimated buffer level in time, using equation (13) below:

$$(13)$$

$$\text{Updated Adjustment value or Delta} =$$

$$\frac{\text{target buffer utilization level (ms)} - \text{estimated current buffer level (ms)}}{\text{Flow Control Interval duration (ms)}} =$$

$$\frac{10 \ \text{ms} - 14.1 \ \text{ms}}{500 \ \text{ms}} * 100 = -0.82$$

As illustrated FIG. 1C, the CRO module 116 can determine the new adjustment value or delta as −0.82%, or −4.1 ms divided by 500 ms. This indicates that the backhaul data transfer rate should be 0.82% less than the 200 Msps channel transmission symbol rate in order to close the gap between the current estimated buffer utilization (e.g., 14.1 ms or 2,819,512 symbols) and the target buffer utilization level 127 (e.g., 10 ms or 2,000,000 symbols) over the course of a FCI period having a duration of 500 ms. The changes to the backhaul data transfer rate by the data center 102 are not synchronized to align with the FCI periods of the gateway 106, and indeed the use of the estimated buffer utilization helps account for the offset. There is no need for the data buffer 124 to reach the specific target buffer utilization level 127 in a single FCI period, rather, the repeated adjustments to the backhaul data transfer rate can continually bring the rate up and down as appropriate. In effect, this provides feedback control to maintain the buffer utilization near and centered around the target buffer utilization level 127 even as conditions change in the satellite network and in the backhaul network 104.

During stage (Q'), the CRO module 116 can determine the adjusted backhaul data transfer rate using the new adjustment value or delta. For example, the CRO module 116 can determine the adjusted transmission symbol rate using the techniques of stage (Q) described for FIG. 1B above, as shown below using equation (14) below:

$$\text{Adjusted Symbol Rate} = \tag{14}$$

$$= \text{Transmission Symbol Rate} + \text{Transmission Symbol Rate} * \text{Delta percentage}$$

$$= 200\frac{MSym}{s} + 200\frac{MSym}{s} * -0.0082$$

$$= 200\frac{MSym}{s} - 1.64\frac{MSym}{s}$$

$$= 198.36\frac{MSym}{s}$$

As shown above, the CRO module 116 determines the adjusted backhaul data transfer rate by adjusting the channel transmission symbol rate (e.g., 200 Msps) by the adjusted delta percentage. In this example, the CRO module 116 determines that the backhaul data transfer rate should be set to 198.36 Msps. Because this rate is less than the channel's transmission symbol rate, the gateway 106 will extract and transmit forward channel data from the data buffer 124 faster than it is refilled by forward channel data transmitted over the backhaul network 104, which allows the buffer utilization to decrease toward the target utilization level 127 in a controlled way.

During stage (R'), the CRO module 116 organizes forward channel data into packets to be transmitted to the gateway 106 using the techniques discussed above for stage (R) of FIG. 1B.

During stage (S'), the CRO module 116 adjusts the backhaul data transfer rate to the newly determined rate of 198.36 Msps, using the techniques discussed above for stage(S) from FIG. 1B.

During stage (T'), the router 118 sends the packets of forward channel data as data packets 119c over the backhaul network 104 to the gateway 106, using the techniques of stage (T) of FIG. 1B.

Figure 2:
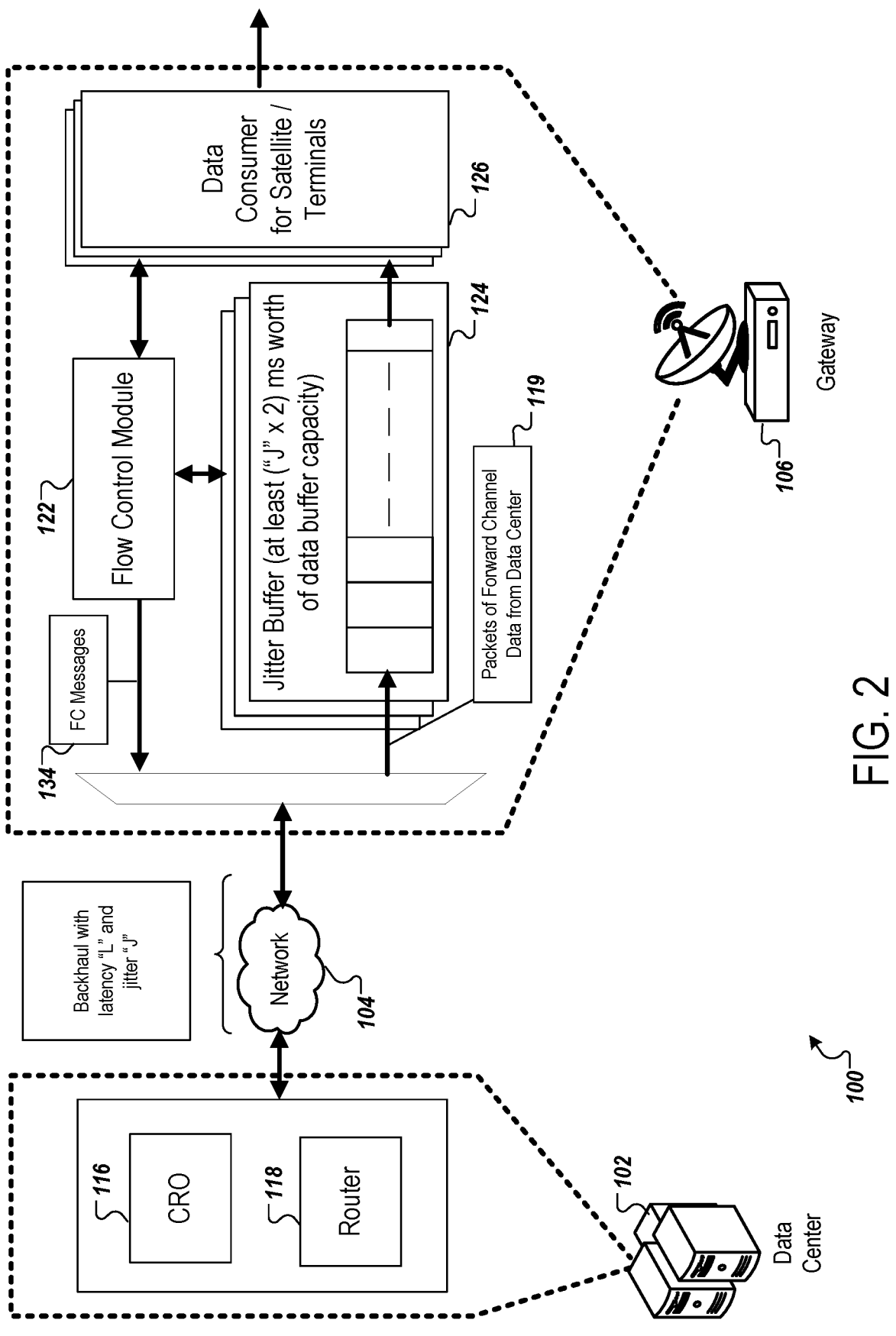

FIG. 2 is a diagram that shows aspects of the system 100 for dynamically adjusting characteristics of data transfer from a data center in a satellite communication network. As discussed above, the data center 102 and the gateway 106 communicate over one or more backhaul links on the backhaul network 104.

As discussed above, the data center 102 can include a code rate optimizer (CRO) module 116 and a router 118. A CRO is a module or component that organizes data transmission to access a certain radio resource based on the appropriate modulation and coding so that spectrum utilization can be used efficiently. The CRO may dynamically estimate bandwidth capacity in terms of data rate and organize data into a multiplexed data stream so as to efficiently utilize the spectrum bandwidth for transmission. The multiplexed data stream can then be broadcast to remote terminals associated with the CRO. In general, although a remote terminal may receive the entirety of the data stream, the remote terminal typically only accesses its own part via specific addressing.

The data center 102 receives reverse channel data from the gateway 106, and the data center 102 can send requests from terminals to the appropriate servers to obtain forward channel data to send to the terminals. The data center 102 can transmit the forward channel data over the backhaul network 104 to the gateway 106, which stores the data in a data buffer 124 for a channel. The gateway 106 can extract data from the buffer 124 to transmit in the channel of the satellite network to one or more terminals. The data center 102 can support multiple channels, with each channel having its own data buffer and corresponding target buffer utilization level. Similarly, each channel can have its own data stream of forward channel data sent over the backhaul network 104, and its own separate backhaul data transfer rate. In addition, the flow control module 122 can send FC messages 134 for each channel, or FC messages 134 that include information for each of the different channels being supported.

In some implementations, the CRO module 116 and the router 118 cooperate to transmit data at a particular symbol rate, where the symbol rate is measured in terms of symbols that are wirelessly transmittable in the satellite network. The CRO module 116 can use information in FC messages 134 from the gateway 106. The FC messages 134 can include data that enables the CRO module 116 to calculate and use a new backhaul data transfer rate.

Each backhaul link or backhaul network 104 can be monitored and characterized to determine its latency "L" and latency jitter "J". The latency L of a backhaul link can be represented as a delay time of transmission between the data center 102 and the gateway 106. Often, the latency L is calculated as an average latency over a period of time. The latency jitter J can represented a measure of variability in latency between the data center 102 and the gateway 106 over the particular backhaul link, such as the maximum difference in latency occurring over a period of time.

The gateway 106 can allocate the data buffer 124 for a channel to have a size of at least two times the latency jitter J of the backhaul link used to transfer forward channel data for the channel. For example, if the latency jitter J (e.g., maximum latency jitter measured over a period of time) of a particular backhaul link is 10 ms, then the gateway 106 can allocate a buffer size of 20 ms or greater for that data buffer. The target buffer utilization level can be set to the maximum latency jitter J of the particular backhaul link, e.g., 10 ms in this example.

In some implementations, the data center 102 and the gateway 106 can subdivide the data flows for different components of a physical channel, so that flows are adjusted and buffered separately for different traffic types or QoS classes. For example, a separate data buffer may be used for each of different QoS classes transmitted on the same wireless physical channel, and the backhaul data transfer flow rate can be adjusted separately for each of the QoS classes. As a result, each of multiple QoS classes of traffic for a physical channel can be considered and managed as separate virtual channels.

In some implementations, a buffer 124 can be associated with a particular data consumer 126, such as a modulator, RF transmit chain, or other processing components. The data consumer 126 can extract data from one or more data buffers 124, e.g., extract the earliest data stored in the respective data buffer 124 in a First-In-First-Out (FIFO) manner, for example, and process or provide the extracted data so it is transmitted in the TX/RX system of the gateway 106. In some examples, the gateway 106 can include multiple data consumers 126, potentially one for each data buffer 124. In some examples, the gateway 106 can include a single data consumer 126 that extracts and processes or routes forward channel data from each of the multiple buffers 124 to appropriate transmission in the satellite network.

In some implementations, the gateway 106 can manage the buffer 124 and target utilization level independently for each channel. The flow control module 122 can monitor the buffer level in each of the buffers 124. The gateway 106 can define a target buffer utilization level and a flow control period for each of the buffers 124, for example, using the maximum latency jitter J and the maximum latency L of the corresponding backhaul link used. Then, as the data center 102 transmits forward channel data to the gateway 106 for transmission in the satellite network, the gateway 106 can store received data in the appropriate buffers corresponding to the channels. Periodically, at intervals set according to the flow control period duration for each of the buffers 124, the flow control module 122 can measure a buffer level in each of the buffers 124 and generate an FC message 134 to provide to the CRO module 116 at the data center 102 over backhaul network 104.

The CRO module 116 can receive the FC message 134, extract its contents, and calculate the new transmission symbol rate for the data center 102 from the extracted contents. For example, the CRO module 116 can compare a measure of the buffer level (or an estimated buffer level) with the target buffer utilization level extracted from the FC message 134. Based on the comparison, the CRO module 116 can determine a new backhaul data transfer rate to be used in transferring forward channel data for the corresponding channel.

Figure 3:
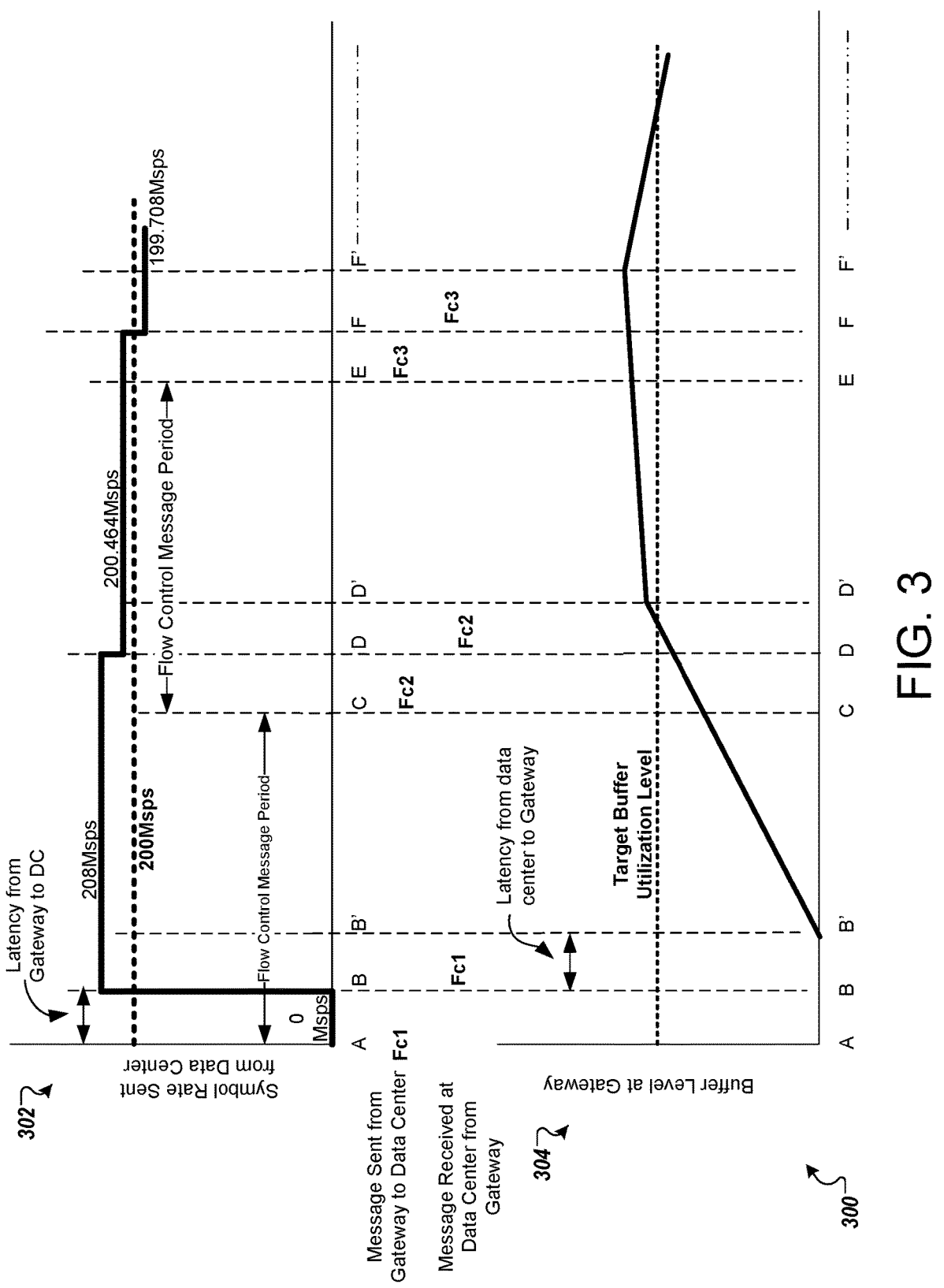
FIG. 3 shows graphs that illustrate adjusting data transfer from a data center to a gateway according to a buffer utilization level at the gateway.

FIG. 3 shows various graphs 300 that illustrate a progression of dynamically adjusting characteristics of a data transfer from a data center to a gateway according to a buffer depth level at the gateway. The graphs 300 include a graph 302 and a graph 304, which are vertically aligned to show the timing of a number of events, listed as A through F', which occur as a data center changes its transmission symbol rate according to flow control messages transmitted by the gateway. The horizontal axis of both graphs 302, 204 represents time and shows the sequence of events A through F'. In graph 302, the vertical axis indicates the backhaul data transfer rate for forward channel data from the data center to the gateway. In graph 304, the vertical access indicates the buffer level at the gateway, and how the buffer level changes as the transmission symbol rate changes in graph 302.

For this example, the target buffer utilization level at the gateway is equivalent to the maximum jitter for the backhaul link. For this backhaul link, the maximum jitter is equivalent to 20 ms. The transmission symbol rate for the channel in the satellite network is S=200 Msps. The gateway's flow control module has a flow control interval (FCI) duration of 500 ms. For example, every 500 ms, the gateway's flow control module can measure the buffer utilization level of the corresponding buffer. The data center can track of the number of symbols sent in each packet of the data stream sent over the backhaul link. The data center can calculate the number of packets or set of packets sent between a particular packet number indicated by the gateway, e.g., a packet sequence number indicated in the FC message, and the packet number most recently sent on the backhaul link by the data center and to the gateway. By using the packet numbers to determine the amount or set of packets sent between the end of the last FCI period and receipt of the FC message, the data center can more accurately estimate the buffer utilization to take into account packets send in the intervening time period since the end of the last FCI period.

At event A, the gateway transmits a first FC message to the data center. The FC message includes an initial buffer level for the data buffer at the gateway, a target buffer utilization level, and a packet identifier or packet sequence number. For example, the flow control module can measure the buffer level to be 0 symbols, can set the target buffer utilization level to be 20 ms, and include a packet number $P_a=0$. The FCI duration can be provided also, or may be set in advance and may not need to be provided in the FC messages. The packet number $P_a$ is initially set to zero in this example, because the data center does not start transmitting packets until after receiving the first FC message from the gateway. In this example, the gateway is starting up transmission on the corresponding channel, and so initially 0 code blocks or packets have been transmitted by the data center to the gateway for this channel.

At event B, the data center receives the FC message from the gateway. The data center can calculate the adjusted delta as shown below:

$$\text{Adjustment value or Delta} = \frac{20 \text{ ms} - 0 \text{ ms}}{500 \text{ ms}} * 100\% = 4\%$$

Since there have been no packets sent in the intervening period of transit of the FC message, there is no need to use an updated or estimated buffer utilization level. In other words, Three are not yet any symbols sent after packet number $P_a=0$.

The gateway can then calculate the adjusted symbol rate below, to provide the base transmission symbol rate of the channel plus an additional amount set based on the adjusted delta of 4%:

$$\text{Adjusted Backhaul Data Transfer Rate} =$$
$$200 \frac{MSym}{s} + 200 \frac{MSym}{2} * 4\% = 208 \, MSym/s$$

The code rate optimizer can apply the newly adjusted symbol rate at event B, e.g., 208 Msps, for subsequent transmissions at the router of the data center.

At event B', following a short latency period (e.g., latency of the backhaul network), the gateway begins receiving forward channel data from the data center at the newly adjusted symbol rate of 208 MSym/s. For example, the gateway can receive one or more codeblocks and the corresponding buffer starts to fill with the one or more received codeblocks.

At event C, the flow control module again measures the buffer level in the buffer after 500 ms has elapsed, e.g., the end of the current FCI period has been reached. In the example, the buffer level is 3 MSyms. Moreover, the flow control module can record the packet that was most recently received and processed in the just-ended FCI period as packet number $P_c$. The flow control module can generate a second FC message, e.g., $FC_2$, and transmit the $FC_2$ message to the code rate optimizer at the data center. In this example, the $FC_2$ message can include the measured buffer utilization level of 3 MSyms or 15 ms, the target buffer utilization level of 4 MSyms or 20 ms, and the packet number of $P_c$.

At event D, the code rate optimizer receives the $FC_2$ message from the gateway. The code rate optimizer identifies the packet number $P_c$ from the $FC_2$ and determines the number of symbols worth of forward channel data sent over the backhaul network since the packet number $P_c$ was sent. For example, the code rate optimizer can determine the total number of symbols that have been sent after the packet numbered $P_c$ until the packet, having packet number $P_d$, that was last sent by the data center when the $FC_2$ message was received. The code rate optimizer can determine the number of transmitted symbols, Y, between $P_c$ and $P_d$ to be $=20$ MSyms. 20 MSyms can represent the number of symbols transmitted starting with the packet number $P_c+1$ up to and including packet number $P_d$. Based on the number of transmittable symbols of data that were sent between $P_c$ and $P_d$, the code rate optimizer can estimate a current buffer level at the gateway at time D in symbols:

$$\text{Estimated Buffer Utilization} = \text{Measured Buffer Level} + \left( \frac{\text{delta}}{1 + \text{delta}} * Y \right)$$

$$\text{Estimated Buffer Utilization} =$$
$$3 \, MSyms + \left( \frac{0.04}{1 + 0.04} * 20{,}000{,}000 \text{ symbols} \right)$$
$$= 3{,}769{,}230 \text{ symbols}$$

As shown above, the code rate optimizer can add the buffer level of 3 MSyms to 769,230 symbols to be 3,769,230 symbols or 3.769230 MSyms.

The code rate optimizer can estimate the buffer level in time at the gateway, assuming the configured 200 Msps transmission symbol rate of the channel.

$$\text{Buffer Level in Time} = \frac{3{,}769{,}230 \text{ symbols}}{200{,}000 \text{ Msps}} = 18.84 \text{ ms}$$

Then, the code rate optimizer can calculate the newly adjusted delta based on the estimated buffer level:

$$\text{Adjusted Delta} = \frac{20 \text{ ms} - 18.84 \text{ ms}}{500 \text{ ms}} * 100\% = 0.232\%$$

Afterwards, the code rate optimizer can calculate the adjusted symbol rate for the data center for subsequent transmissions using the calculated adjustment value or delta, below:

$$\text{Adjusted Backhaul Data Transfer Rate} =$$
$$200 \frac{MSym}{s} + 200 \frac{MSym}{2} * 0.232\% = 20.464 \, MSym/s$$

Both the buffer utilization level at event C indicated in the $FC_2$ message and the estimated buffer utilization level at event D are below the target buffer utilization level. As a result, the adjusted backhaul data transfer rate is greater than the channel transmission symbol rate of 200 Msps. Nevertheless, because the difference is much less than before, the adjusted backhaul data transfer rate is also smaller, e.g., only 0.232% higher rather than being 4% higher.

At event D', the data stream of forward channel data from the data center, provided at the newly adjusted symbol rate, e.g., 200.464 MSym/s, is received at the gateway from the data center.

At event E, the flow control module again measures the buffer utilization level for the buffer after 500 ms has elapsed since event C, e.g., at the end of another FCI period. In the example, the buffer level is measured at 4.1 MSyms. The flow control module can record the packet that was most recently received as packet number $P_e$. The flow control module generates a third FC message, e.g., $FC_3$, and transmits the $FC_3$ message to the code rate optimizer at the data center. In this example, the $FC_3$ message includes the measured buffer level of 4.1 MSyms, the target buffer utilization level of 20 ms, and the packet number $P_e$.

At event F, the code rate optimizer receives the $FC_3$ message from the gateway. The $FC_3$ message shows that the buffer utilization level has now exceeded the target buffer utilization level. The code rate optimizer retrieves the packet number $P_e$ from the $FC_3$ message and determines the number of symbols sent since the packet number $P_e$. For example, the code rate optimizer can determine the total number of symbols that have been sent after the packet number $P_e$ until the packet that was last sent by the data center when the $FC_3$ message was received, e.g., packet number $P_f$. The code rate optimizer determines the number of symbols between $P_e$ and $P_f$ to be =20 MSyms. 20 MSyms can represent the number of symbols sent starting with the packet number $P_e$+1 until packet number $P_f$ was sent. Based on the number of symbols that were sent between $P_e$ and $P_f$, the code rate optimizer can estimate a current buffer level at the gateway at time F in symbols as shown below:

$$\text{Estimated Buffer Utilization} = \text{Measured Buffer Level} + \left( \frac{delta}{1 + delta} * Y \right)$$

$$\text{Estimated Buffer Utilization} =$$

$$4.1 \, MSyms + \left( \frac{0.00232}{1 + 0.00232} * 20{,}000{,}000 \text{ symbols} \right)$$

$$= 4{,}146{,}292 \text{ symbols}$$

As illustrated above, the code rate optimizer can add the buffer level of 4.1 MSyms to 46,292 symbols to be 4,146, 292 symbols or 4.14 MSyms to determine the estimated buffer utilization at the gateway.

The code rate optimizer can estimate the buffer level in time at the gateway, assuming the 200 Msps symbol rate.

$$\text{Buffer Level in Time} = \frac{4{,}146{,}292 \text{ symbols}}{200{,}000 \text{ Msps}} = 20.73 \text{ ms}$$

Then, the code rate optimizer can calculate the newly adjusted delta based on the estimated buffer level in time, using the equation (25) below:

$$\text{Adjusted Delta} = \frac{20 \text{ ms} - 20.73 \text{ ms}}{500 \text{ ms}} * 100\% = 0.146\%$$

Afterwards, the code rate optimizer can calculate the adjusted symbol rate for the data center for subsequent transmissions using the calculated delta percentage, shown below:

$$\text{Adjusted Backhaul Data Transfer Rate} =$$

$$200 \frac{MSym}{s} + 200 \frac{MSym}{2} * 0.146\% = 199.708 \, MSym/s$$

At event F', the adjustment to the backhaul data transfer rate of forward channel data stream, provided by the data center at the newly adjusted backhaul data transfer rate, e.g., 199.708 Msps, begins to decrease the buffer utilization level. This occurs because the backhaul data transfer rate is less than the transmission symbol rate of the channel (e.g., 200 Msps), so the concurrent backhaul data transfer and transmission of data out of the buffer causes the buffer utilization to decrease toward the target buffer utilization level.

The steps of monitoring and adjusting the parameters for the backhaul data transfer rate can be repeated at the end of each FCI period, while the gateway continually transmits forward channel data out of the buffer to the terminals. The gateway can also monitor changes in latency and latency jitter, and use those measures to adjust the target buffer utilization level, which in turn can affect the backhaul data transfer rate.

FIG. 4 is a flow diagram that illustrates an example process 400 for dynamically adjusting characteristics of a data transfer from a data center (e.g., a server system) to a gateway of a satellite communication network. The process 400 can be performed by one or more components in a data center, such as data center 102 of system 100.

The data center can receive data to transmit to one or more terminals over a satellite network (402). The data center can be configured to receive forward channel data for transmission to terminals, and then organize the forward channel data into a data stream that is transmitted over a backhaul network from the data center to a gateway. The gateway can receive the data stream of forward channel data, store the forward channel data in a buffer, and transmit the forward channel data from the buffer to one or more terminals over a satellite network. The forward channel data can include, for example, video, audio, text, and other types of data.

The data center can organize the forward channel into data packets (404). In some implementations, a code rate optimizer (CRO) module at the data center can determine the transmission parameters for the forward channel data in the satellite network, so that the number of transmittable symbols in the satellite network are known. For example, the modulation and coding to be used in transmitting data in the satellite network can be determined to accurately translate and track backhaul transfers in terms of transmittable symbols in the satellite network.

In some implementations, the data center can assign transmission parameters for forward channel data in the satellite network (406), and use the transmission parameters in organizing data into packets. Depending on the modulation and coding that will be used in the satellite network, a set of data may occupy a different number of symbols. The modulation schemes to be used for the forward channel data can be determined by the data center. Examples of modulation schemes can include, for example, Binary Phase Shift Keying (BPSK), Offset Quadrature Phase Shift Keying (OQPSK), Quadrature Phase Shift Keying (QPSK), 8-Phase Shift Keying (8-PSK), 16 Amplitude Phase Shift Keying (16-APSK), and 16-QAM, to name some examples. For these modulation schemes, the number of bits per symbol (bps) is 1 bps for BPSK, 2 bps for OQPSK, 2 bps for QPSK, 3 bps for 8-PSK, 4 bps for 16-APSK, and 4 bps for 16-QAM. Additionally, the data center can determine other transmission parameters that affect the number of symbols used to transmit forward channel data, such as a FEC encoding algorithm or FEC code rate. The transmission parameters, and the resulting number of symbols represented by the data, can be used to organize the data into packets or codeblocks and to track the number of symbols represented by the respective packets or codeblocks.

The data center can receive, from the gateway, data indicating a buffer status of a buffer of the gateway (408). The data center can receive a flow control (FC) message that includes data describing conditions of the buffer at the gateway. The FC message can include (i) a measured utilization of the buffer at the gateway, (ii) a target buffer utilization level for the buffer, (iii) data, such as a packet number, identifying the last packet received at the gateway during the most recent flow control interval, and (iv) data indicating the duration of the flow control interval at which the gateway evaluates data flow properties. The FC message can be provided for a particular buffer of the gateway, where the particular buffer corresponds to a specific channel in the satellite network.

Based on buffer status, the data center can adjust a backhaul data transfer rate for transmitting forward channel data to the gateway over the backhaul network (410). The data center can extract the various data components in the received FC message to determine an adjusted data transfer rate for transmitting forward channel data to the gateway. For example, the data center can compare the current utilization of the buffer to a target buffer utilization, the target buffer utilization representing a reference buffer level that is desired. Based on the comparison, or based on the difference between the measured and target buffer utilization levels, the data center can determine an adjustment value or delta that indicates how the backhaul data transfer rate should be set. In some cases, an estimated buffer utilization level is calculated, taking into account the amount of additional forward channel data sent over the backhaul network between the generation of the FC message and receipt of the FC message. The difference between the estimated buffer utilization level and the target buffer utilization level can be used to determine the adjustment value or delta. In some cases, the adjustment value or delta is based on the difference in buffer utilization levels (e.g., estimated and target levels) divided by an amount of time representing one or more flow control interval periods.

To estimate the buffer utilization level, the data center can determine a number of symbols that have been transmitted between (i) a last packet number received by the gateway at the end of the FCI period represented by the FC message and (ii) a last or most recent packet transmitted by the data center to the gateway when the FC message is received by the data center. The FC message's inclusion of data identifying the last packet received at the gateway at which the analyzed level of the buffer was measured reflects the last packet number received by the gateway. The data center tracks the packets it transmits in order to identify the most recent packet it transmitted to the gateway. As an example, the data center can determine from the FC message that the last packet received during the corresponding FCI period is packet number N. The data center can determine that the last packet it transmitted before receiving the FC message is N+5. Thus, the data center can determine that five packets have been transmitted in the intervening time since the FC message was generated or sent. The data center can determine that each transmitted packet includes, for example, 4,000 symbols of forward channel data, and as such, 20,000 symbols have been transmitted between the time frame identified by these two packets.

Using the number of symbols that have been transmitted between the time frame identified by the two packets, the current utilization of the buffer identified in the FC message, and the determined buffer delta, the data center can estimate a buffer level at the gateway. The estimated buffer utilization can be performed using equation (4) above, for example. In response to determining the estimated buffer level at the gateway, the data center can determine a current utilization of the buffer in time. The current utilization of the buffer in time can be calculated by dividing the estimated level of the buffer by the current data transfer rate at the server system, such as that shown in equation (6) above. Using the current utilization of the buffer in time, the target buffer utilization, and the data indicating a frequency at which the gateway measures the current utilization of the buffer, e.g., the FCI period, the data center can determine a newly adjusted delta of the buffer at the gateway. This can be performed using equation (7) above.

The data center can calculate an adjusted backhaul data transfer rate using the adjustment value or delta. The adjusted backhaul data transfer rate can be calculated by adjusting the transmission symbol rate for a corresponding channel (e.g., the channel that transmits data from the buffer) using the determined adjustment value or delta. The data center can perform this calculation for each of multiple buffers, with each buffer being used to store data for a different channel.

The data center transmits the packets to the gateway based on the adjusted backhaul data transfer rate over the backhaul network, so the gateway can then transmit the forward channel data to the terminals over the satellite network (412). For example, the data center can send the packets to achieve the adjusted backhaul data transfer rate calculated. For example, the adjusted backhaul data transfer rate can be 205 Msps. The size of packets and/or the rate at which packets are generated and/or transmitted over the backhaul network can be adjusted to achieve the calculated rate of 205 Msps.

The gateway can perform a number of operations to help manage buffer utilization and adjust backhaul data flow. The gateway can receive the data packets transmitted by the data center and store the received forward channel data in the appropriate buffer before transmitting the data in the satellite network. In some implementations, the gateway can use different buffers for different channels.

A processing system of the gateway can monitor the status of each buffer. For example, the processing system of the gateway can include, for example, a flow control module that monitors the depth or utilization of the bufferThe flow control module can perform the monitoring of the buffer repeatedly at a flow control interval (FCI). For example, the FCI can be 200 ms, 250 ms, 300 ms, 500 ms, or another defined FCI.

Each time the FCI period elapses, the flow control module can check the utilization of the buffer, generate an FC message, and transmit the FC message to the data center.

The FC message can include (i) the current utilization level of the buffer, (ii) the target buffer level utilization, (iii) the FCI period, and (iv) data identifying the last packet that was received by the gateway when the buffer level was measured by the gateway. Each time the FC message is transmitted to the data center, the data center can adjust, if appropriate, a backhaul data transfer rate for subsequent data transfer.

The flow control module can set and adjust the target buffer utilization for the buffer. The target buffer utilization level can be based on measuring latency over the backhaul network using the received data packets from the data center. For example, the flow control module can determine a timestamp in a header of a packet indicating when the packet was transmitted and compare the timestamp with a timestamp indicating when the packet was received by the gateway. The difference can indicate the latency for that packet. The combined latency measurements for many packets over a period of time can be used to determine the average latency and the latency jitter, which can indicate a variability in latency of packets sent over the backhaul link.

In some implementations, the flow control module can determine the target buffer utilization as a reference buffer level for a desired amount to be stored in the buffer at any given time. For example, the target buffer utilization can be set to a 50% utilization of the buffer or equivalent to the maximum jitter of the backhaul link. In some examples, the target buffer utilization can be set to an average latency for the particular backhaul link, measured over a period of time. In this manner, the flow control module can attempt to ensure the buffer remains filled according to the average latency of the respective backhaul link. The average can be performed over a few minutes or a few hours to ultimately minimize the latency, e.g., storage based on the network conditions and congestion over a particular backhaul link at any given time.

In some implementations, the flow control module can define a maximum size of the buffer. The flow control module can determine a maximum size of the buffer using a maximum variable latency over the backhaul link or based on two times the maximum jitter perceived by the gateway. For example, the flow control module can determine the maximum size of the jitter across the backhaul link, multiply the maximum size of the jitter by a value of two, and apply the maximum size of the buffer to be the result of the maximum size of the jitter multiplied by the value of two in an attempt to prevent the buffer from experiencing underflow or overflow when attempting to transmit data to the terminals over the satellite using data received from the data center.

In response to the flow control module providing the FC messages to the data center, the data center can perform various processes to adjust the backhaul data transfer rate. In some implementations, if the data center determines the current utilization of the buffer at the gateway is greater than the target utilization of the buffer, then the data center may reduce the backhaul data transfer rate (or at least use a rate less than the channel's transmission symbol rate) in order to reduce the utilization of the buffer at the gateway. In some implementations, if the data center determines the current utilization of the buffer at the gateway is less than the target utilization of the buffer, then the flow control module may increase the backhaul data transfer rate (or at least use a rate greater than the channel's transmission symbol rate) to increase the overall utilization of the buffer at the gateway.

FIG. 5 is a flow diagram that illustrates an example process 500 for dynamically adjusting characteristics of a data transfer from a data center in a satellite communication system. The process 500 can be performed by one or more components of a gateway, such as gateway 106 of system 100.

The gateway receives, from a data center over a backhaul network, a stream of data to be transmitted over a satellite network to terminals (502). The stream of data can include, for example, video, audio, text, or other data.

The gateway stores the received forward channel data in a buffer (504). The gateway extracts data from the buffer to transmit in the corresponding channel, while also entering newly received forward channel data in the buffer.

In some implementations, the gateway can include multiple buffers, with different buffers being used to store data for different channels. Each buffer is individually monitored, so a buffer status is tracked for each channel and the backhaul data transfer rate is adjusted for each channel. In some examples, when the gateway receives forward channel data over the backhaul network for a particular channel, the router can store the received data in the appropriate buffer for that particular channel. Thus, the gateway can route forward channel data for different channels to the appropriate buffers for those channels.

The processing system can determine a buffer utilization level of the buffer (506). For example, the flow control module can measure the current utilization or current depth of the buffer. A processing system of the gateway can monitor the buffer and periodically determine the buffer utilization level. The processing system of the gateway can include, for example, a flow control module that monitors the depth level of the buffer. For example, the flow control module can measure a buffer depth in the buffer. The flow control module can perform the monitoring of the buffer at a flow control interval (FCI) period. For example, the FCI period can be 200 ms, 250 ms, 300 ms, 500 ms, or another defined FCI period.

The processing system can transmit a message that indicates buffer utilization information (508). Each time the FCI period elapses, the flow control module can determine the buffer utilization, generate an FC message, and transmit the FC message to the data center. The FC message can include an adjusted transmission symbol rate based on a measured level of the buffer. Each time the FC message is transmitted to the data center, the data center can adjust a transmission symbol rate for subsequent data transmissions using the subsequent symbol rate in the FC message.

The FC message including the current buffer utilization can be configured to trigger or instruct adjustment to the backhaul data transfer rate at the data center. For example, the flow control module can generate an FC message that includes various types of information. The information in the FC message can include, for example, the measured utilization of the buffer, the target buffer utilization level, data identifying the last packet received at the gateway as of the end of the FCI period, and data indicating a frequency at which the gateway measures the current utilization of the buffer, to name some examples. The flow control module of the gateway can transmit the FC message to the data center. The FC message can prompt the code rate optimizer at the data center to determine a new backhaul data transfer rate for subsequent data transmissions In some implementations, instead of or in addition to sending buffer status information in the FC message, the gateway can send data indicating an adjusted backhaul data transfer rate to be used. In other words, instead of the data center calculating the new backhaul data transfer rate, the gateway may perform the calculation and instruct the data center the appropriate backhaul data transfer rate to use. In further detail, the FC module of the gateway can measure a level of the buffer at the gateway, determine an adjustment value or delta with respect to the channel's transmission symbol rate, and determine a new backhaul data transfer rate for the data center. The flow control module can provide the newly determined transmission symbol rate to the CRO that causes the data center to set the newly determined transmission symbol rate for subsequent transmissions.

The gateway can periodically monitor the latency and jitter of the backhaul network and can set a new target utilization level for the buffer in response. For example, if the maximum latency jitter increases, the gateway can increase the target buffer utilization level for the buffer. Similarly, if the maximum latency jitter decreases, the gateway can decrease the target buffer utilization level for the buffer. The target buffer utilization level is one parameter that then affects the resulting backhaul data transfer rate that is calculated.

In some implementations, the flow control module can define or adjust a maximum size of the buffer. The flow control module can determine a maximum size of the buffer using a maximum variable latency over the backhaul link or based on a maximum jitter perceived by the gateway. The flow control module can calculate the maximum size of the buffer by multiplying the measured maximum jitter over the backhaul network by a factor, e.g., 2, and applying the result of the multiplication as the maximum size of the buffer in an attempt to prevent the buffer from experiencing underflow or overflow when attempting to transmit data to the terminals over the satellite using data received from the data center.

In some implementations, the FC messages may be provided in response to determining that a measured condition meets a threshold, in addition to or instead of at a predefined interval. For example, the gateway may send FC messages when the buffer utilization level is detected to deviate from the target buffer utilization level but at least a threshold amount (e.g., 10%, 25%, 50%, etc., or 1 Msym, 2 Msym, 5 Msym, etc.).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:

receiving, by the one or more computers, forward channel data to transmit to one or more terminals over at least one wireless channel of a satellite network;

receiving, by the one or more computers, a message from a gateway over a backhaul network, wherein the message includes buffer information for a data buffer of the gateway, wherein the data buffer corresponds to the at least one wireless channel;

determining, by the one or more computers, a reference data transfer rate;

determining, by the one or more computers, an adjustment factor based on a difference between a target buffer utilization level for the data buffer and a utilization level of the data buffer;

determining, by the one or more computers, a data transfer rate by adjusting the reference data transfer rate by the adjustment factor, wherein the determined data transfer rate increases or decreases a rate of forward channel data transfer to the gateway to move the current utilization of the buffer toward the target buffer utilization level; and transmitting, by the one or more computers, the forward channel data to the gateway over the backhaul network at the determined data transfer rate, the forward channel data being transmitted to the gateway for transmission by the gateway to the one or more terminals over the at least one wireless channel of the satellite network.

2. The method of claim 1, wherein the buffer information comprises buffer status information that specifies at least one of (i) a utilization level of the data buffer and a target utilization level for the data buffer or (ii) a difference between the utilization level of the data buffer and the target utilization level of the data buffer; and wherein the data transfer rate is determined based at least in part on the buffer status information.

3. The method of claim 2, wherein the utilization level of the data buffer indicates at least one of (i) a quantity of symbol-sized portions of forward channel data that are stored in the data buffer or (ii) an measure of transmission time to transmit the forward channel data stored in the data buffer on the at least one wireless channel; and wherein the data transfer rate to transmit the forward channel data to the gateway is a symbol rate for forward channel data to be sent to the gateway over the backhaul network.

4. The method of claim 2, wherein the target utilization level is based on at least one of (i) a measure of latency of communication between the one or more computers and the gateway over the backhaul network or (ii) a measure of variation in latency of communication between the one or more computers and the gateway over the backhaul network.

5. The method of claim 1, wherein the message corresponds to a particular time, and wherein the buffer information includes a packet identifier that identifies a data packet that, at the particular time, most recently had its forward channel data added to the data buffer; and wherein the data transfer rate is determined based at least in part on the packet identifier.

6. The method of claim 5, wherein determining the data transfer rate comprises:

determining a quantity of forward channel data sent since transmission, by the one or more computers, of the data packet indicated by the packet identifier in the buffer information; and determining the data transfer rate to account for the quantity of forward channel data sent since transmission of the data packet indicated by the packet identifier in the buffer information.

7. The method of claim 1, wherein the buffer information specifies a packet identifier that, at the particular time, most recently had its forward channel data added to the data buffer and at least one of (i) an interval between assessments of a status of the data buffer or (ii) a frequency at which the status of the data buffer is assessed; and wherein the data transfer rate is determined based at least in part on the packet identifier.

8. The method of claim 1, comprising:

assigning transmission parameters for transmitting the forward channel data in the satellite network;

based on the assigned transmission parameters:

applying forward error correction (FEC) coding to the forward channel data to generate FEC-encoded data; and determining symbol sizes for the FEC-encoded data according to modulations specified by the assigned transmission parameters; and organizing the FEC-encoded data into a series of data packets;

wherein determining the data transfer rate comprises determining a symbol rate for transmission of the FEC-encoded data over the backhaul network; and wherein transmitting the forward channel data to the gateway at the determined data transfer rate comprises transmitting the series of data packets to provide the FEC-encoded data over the backhaul network at the determined symbol rate.

9. The method of claim 1, comprising, before receiving the message, transferring the forward channel data to the gateway over the backhaul network at a first data transfer rate;

wherein determining the data transfer rate comprises determining a second data transfer rate based on the buffer information in the message, wherein the second data transfer rate is different from the first data transfer rate; and wherein the method comprises adjusting data transfer to the gateway from (i) transmitting the forward channel data to the gateway at the first data transfer rate to (ii) transmitting the forward channel data to the gateway at the second data transfer rate.

10. The method of claim 9, wherein the buffer information in the message indicates that utilization of the data buffer is less than a target utilization level for the data buffer;

wherein determining the second data transfer rate comprises determining a data transfer rate that is higher than the first data transfer rate; and wherein adjusting data transfer to the gateway comprises increasing a rate of data transfer to the gateway.

11. The method of claim 9, wherein the buffer information in the message indicates that utilization of the data buffer is higher than a target utilization level for the data buffer;

wherein determining the second data transfer rate comprises determining a data transfer rate that is less than the first data transfer rate; and wherein adjusting data transfer to the gateway comprises decreasing data transfer to the gateway.

12. The method of claim 1, wherein the method includes:

transmitting, to one or more gateways, forward channel data for each of multiple different gateways, wireless channels, or traffic classifications; and separately determining a data transfer rate for each of the multiple different gateways, wireless channels, or traffic classifications based on buffer information for the respective gateways, wireless channels, or traffic classifications.

13. The method of claim 1, wherein the forward channel data is transmitted over the backhaul network in a series of data packets, wherein the buffer information comprises a value indicating (i) a utilization level for the data buffer and (ii) a packet identifier for a packet most recently added to the data buffer at a time corresponding to the message;

wherein the method comprises estimating an updated buffer utilization level based on the utilization level indicated in the message and the packet identifier indicated in the message; and wherein the data transfer rate is determined based in part on the estimated updated buffer utilization level.

14. The method of claim 13, wherein estimating the updated buffer utilization level is performed using (i) the packet identifier, (ii) a quantity of data packets of forward channel data transmitted to the gateway over the backhaul network after the data packet indicated by the packet identifier, and (iii) a transmission symbol rate at which the gateway transmits the forward channel data in the satellite network.

15. The method of claim 1, wherein the adjustment factor is further determined based on a frequency or interval at which the gateway is configured to measure the utilization of the data buffer.

16. The method of claim 1, comprising:

after receiving the message, determining, by the one or more computers, a quantity of forward channel data transmitted by the one or more computers to the gateway over the backhaul network since the gateway transmitted the message; and estimating, by the one or more computers, a utilization level of the data buffer based on (i) a utilization level indicated by the message and (ii) the determined quantity of forward channel data transmitted since the gateway transmitted the message;

wherein the adjustment factor is determined based on the estimated utilization level.

17. The method of claim 16, comprising determining the quantity of forward channel data transmitted since the gateway transmitted the message based on (i) a packet identifier that represents a data packet that was last stored in the data buffer at a time corresponding to a measured buffer utilization indicated in the message and (ii) a packet identifier for a data indicating transmitted by the one or more computers to the gateway over the backhaul network.

18. A system comprising:

one or more computers and one or more storage devices storing instructions that are operable, when executed by the one or more computers, to cause the one or more computers to perform operations comprising:

receiving, by the one or more computers, forward channel data to transmit to one or more terminals over at least one wireless channel of a satellite network;

receiving, by the one or more computers, a message from a gateway over a backhaul network, wherein;

the message includes buffer information for a data buffer of the gateway, wherein the data buffer corresponds to the at least one wireless channel;

the message corresponds to a particular time; and the buffer information includes a packet identifier that identifies a data packet that, at the particular time, most recently had its forward channel data added to the data buffer;

determining, by the one or more computers, a data transfer rate to transmit the forward channel data to the gateway over the backhaul network, wherein the data transfer rate is determined at least in part based on the buffer information in the message from the gateway; and transmitting, by the one or more computers, the forward channel data to the gateway over the backhaul network at the determined data transfer rate, the forward channel data being transmitted to the gateway for transmission by the gateway to the one or more terminals over the at least one wireless channel of the satellite network.

19. One or more non-transitory computer-readable media storing software comprising instructions that are operable, when executed by one or more computers, to cause the one or more computers to perform operations comprising:

receiving forward channel data to transmit to one or more terminals over at least one wireless channel of a satellite network;

receiving a message from a gateway over a backhaul network, wherein:

the message includes buffer information for a data buffer of the gateway, the data buffer corresponds to the at least one wireless channel;

the buffer information specifies at least one of: (i) an interval between assessments of a status of the data buffer, and (ii) a frequency at which the status of the data buffer is assessed;

determining a data transfer rate to transmit the forward channel data to the gateway over the backhaul network, wherein the data transfer rate is determined at least in part based on the buffer information in the message from the gateway; and transmitting the forward channel data to the gateway over the backhaul network at the determined data transfer rate, the forward channel data being transmitted to the gateway for transmission by the gateway to the one or more terminals over the at least one wireless channel of the satellite network.

* * * * *